US008677124B2

(12) United States Patent
Lafon et al.

(10) Patent No.: US 8,677,124 B2
(45) Date of Patent: Mar. 18, 2014

(54) METHOD AND DEVICE FOR SECURING DATA TRANSFERS

(75) Inventors: Martin Lafon, Orsay (FR); Eric Blot-Lefevre, Neuilly-sur-Seine (FR)

(73) Assignee: Trustseed SAS, Galluis (FR)

( * ) Notice: Subject to any disclaimer, the term of this patent is extended or adjusted under 35 U.S.C. 154(b) by 445 days.

(21) Appl. No.: 12/443,857

(22) PCT Filed: Apr. 18, 2007

(86) PCT No.: PCT/FR2007/000653
§ 371 (c)(1),
(2), (4) Date: Nov. 24, 2010

(87) PCT Pub. No.: WO2007/119012
PCT Pub. Date: Oct. 25, 2007

(65) Prior Publication Data
US 2011/0060906 A1   Mar. 10, 2011

(30) Foreign Application Priority Data

Apr. 18, 2006   (FR) ...................................... 06 03415
May 9, 2006    (FR) ...................................... 06 04107
May 9, 2006    (FR) ...................................... 06 04108
May 16, 2006   (FR) ...................................... 06 04481

(51) Int. Cl.
H04L 29/06   (2006.01)

(52) U.S. Cl.
USPC ........... 713/168; 713/169; 713/170; 713/171; 709/227; 709/228; 709/229; 726/2; 726/3; 726/4; 726/26; 726/27; 726/28; 726/29; 726/30

(58) Field of Classification Search
USPC ........... 713/168–171; 709/227–229; 726/2–4, 726/26–30
See application file for complete search history.

(56) References Cited

U.S. PATENT DOCUMENTS

| 5,933,605 | A  | * | 8/1999 | Kawano et al. ............... 709/238 |
| 6,047,103 | A  |   | 4/2000 | Yamauchi et al. |
| 6,101,244 | A  | * | 8/2000 | Okada ..................... 379/100.08 |
| 6,285,777 | B2 | * | 9/2001 | Kanevsky et al. ............ 382/101 |
| 6,519,568 | B1 | * | 2/2003 | Harvey et al. .................. 705/1.1 |

(Continued)

OTHER PUBLICATIONS

International Search Report and Written Opinion issued in corresponding International Application No. PCT/FR2007/000653, dated Aug. 9, 2007.

(Continued)

Primary Examiner — Thanhnga B Truong
Assistant Examiner — Josnel Jeudy
(74) Attorney, Agent, or Firm — Stroock & Stroock & Lavan LLP

(57) ABSTRACT

The method of securing data transfer comprises: a step of attempting to transmit a document from a document sender to at least one document recipient, by implementing at least one transmission attribute and for at least one step of attempted transmission, a step of evaluating the value of at least one transmission attribute and a step of making the evaluation of the value of the transmission attribute available to the sender. Preferably, in the course of the evaluating step, the evaluation is dependent on the anomalies of correspondence that are observed for each attempted transmission. Preferably, in the course of the evaluating step, the evaluation is, moreover, dependent on the elements provided by the recipient in the course of a step of registering with an electronic document transmission service.

11 Claims, 6 Drawing Sheets

(56) References Cited

U.S. PATENT DOCUMENTS

Figure 1:
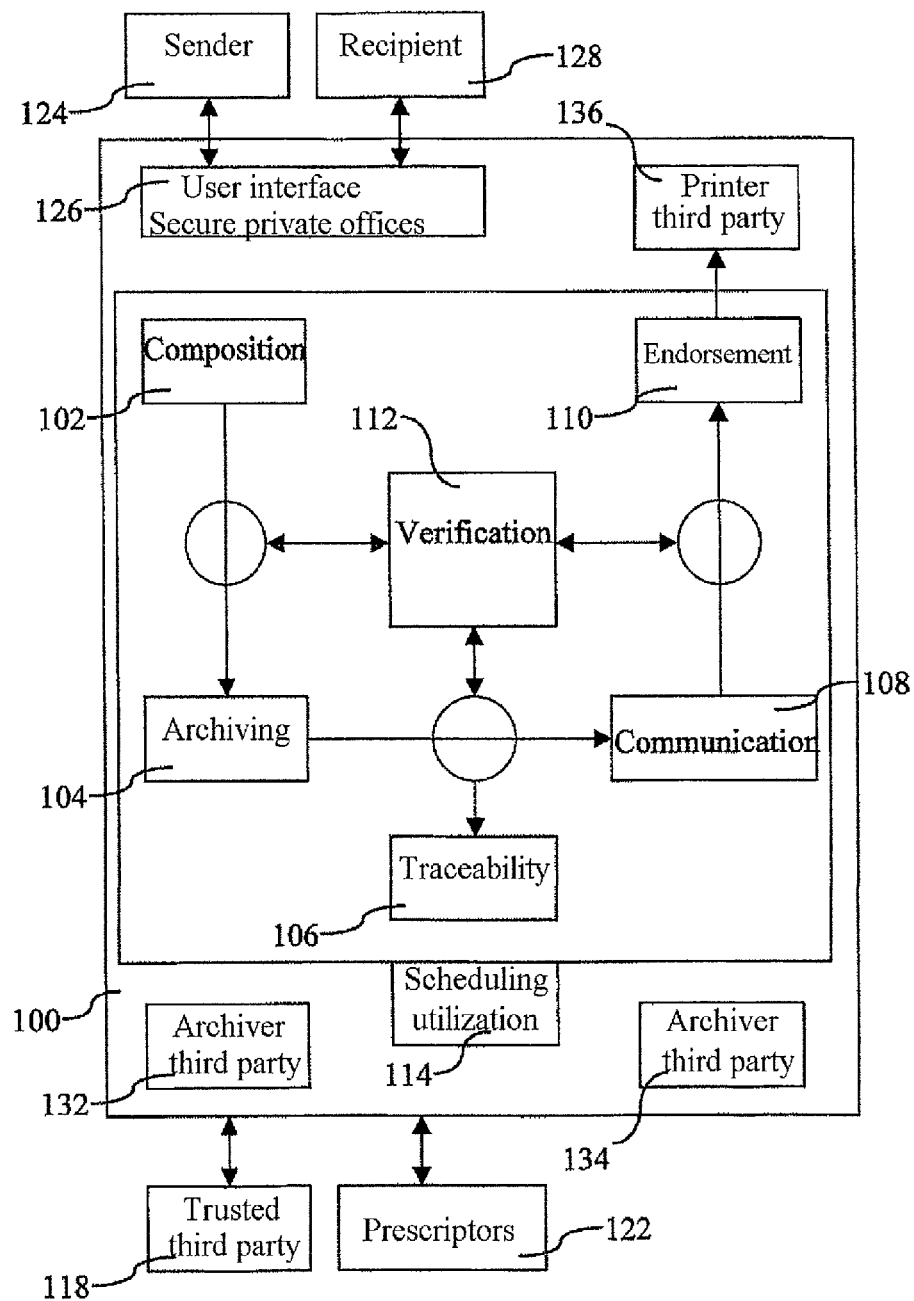

| | | | |
|---|---|---|---|
| 7,010,305 B2* | 3/2006 | Immonen et al. | 455/452.2 |
| 7,069,000 B1* | 6/2006 | Corson et al. | 455/411 |
| 7,178,030 B2* | 2/2007 | Scheidt et al. | 713/176 |
| 7,426,483 B1* | 9/2008 | Dorward et al. | 705/26.8 |
| 2003/0229705 A1 | 12/2003 | Yohichiroh | |
| 2004/0088551 A1* | 5/2004 | Dor et al. | 713/182 |
| 2004/0249988 A1* | 12/2004 | Williams et al. | 710/1 |
| 2005/0120244 A1 | 6/2005 | Choi | |
| 2006/0062219 A1* | 3/2006 | Ookubo | 370/392 |
| 2007/0124803 A1* | 5/2007 | Taraz | 726/4 |

OTHER PUBLICATIONS

Menezes, Vanstone, Oorschot: "Handbook of Applied Cryptography", 1997, CRC Press LLC, USA, pp. 490-491; pp. 547-550; pp. 581-582.

\* cited by examiner

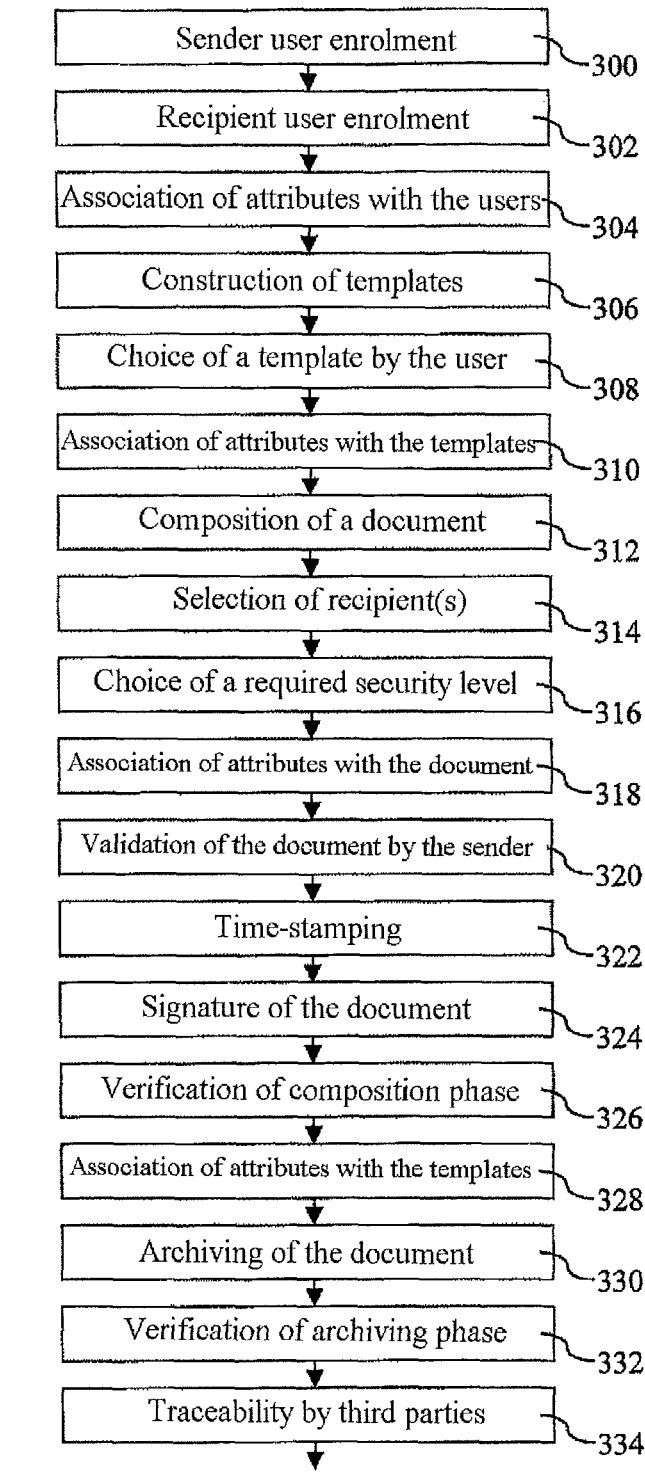
Figure 3A (To 336)

METHOD AND DEVICE FOR SECURING DATA TRANSFERS

CROSS REFERENCE TO RELATED APPLICATIONS

This application is a national phase application under §371 of, and claims priority to PCT/FR2007/000653, filed Apr. 18, 2007, which in turn claims priority to French Patent Application No. 0604481, filed Jun. 16, 2006; French Patent Application No. 0604107, filed May 9, 2006; French Patent Application No. 0604108, filed May 9, 2006; and French Patent Application No. 0603415, filed Apr. 18, 2006, the entire contents all applications are expressly incorporated herein by reference.

The present invention relates to a method and a device for securing data transfers. It applies, in particular, to the transmission of mail, bills, and legal or accounting documents, with notice of receipt.

Hybrid, electronic and postal, methods are known which comprise a step of dispatching electronic mail with provision of a postal address of the recipient, the postal organization printing this mail and conveying its printed version by traditional postal means, with actual delivery and signature, by the recipient, of a notice of receipt.

Methods are also known for transmitting electronic mail termed secure, implementing, both at the sender level and at the recipient level, electronic signature, for example electronic signature in accordance with the Public Key Infrastructure (PKI). These methods do not guarantee that the recipient has been informed of the arrival of an item of electronic mail and possess legal value only in the case of actual receipt of the electronic mail by the recipient.

These methods and devices exhibit numerous other drawbacks.

They do not allow the easy dispatching of a large quantity of heterogeneous documents. They do not guarantee that an original is at the disposal of the sender and that an original is at the disposal of the recipient, as is usual for legal documents.

They do not allow the dispatching of mail to recipients having no means of prior identification.

The present invention is aimed at remedying these drawbacks.

For this purpose, the present invention is aimed, according to a first aspect, at a method for securing data transfer, characterized in that it comprises:
  a step of creating a document by a document sender,
  a step of identifying at least one recipient of said document,
  a step of placing a copy of the document in memory in a first memory accessible by the sender of the document but not accessible by a recipient of the document,
  for each recipient of the document, a step of placing a copy of the document in memory in a second memory accessible by said recipient of the document but not accessible by the sender of the document and
  a step of transmitting to each recipient of the document an information item representative of the existence of a copy of the document at the disposal thereof in a said second memory.

By virtue of these provisions, each one, of the sender and of the recipient, has available a memory where the documents, for which they have been, respectively, sender and recipient, are archived. Each of them therefore has an original and can have it archived in a location of his choice, without running the risk of interfering with the other original.

Thus, if there exists a break in correspondence between two facilities, or right inside a double-entry operation, the error will be detected and repaired.

According to particular characteristics, the method such as succinctly set forth above comprises a step of time-stamping each step of placing a copy of the document in memory.

By virtue of these provisions, each party to the correspondence can verify the date of placing in memory of the copy of the document in the memory reserved therefor.

According to particular characteristics, the method such as succinctly set forth above comprises a step of authenticating the recipient and, in the case of positive authentication, a step of access, by said recipient, to the copy of the document available in the second memory.

By virtue of these provisions, the sender of the document can impose an authentication of the recipient before the latter becomes aware of the document intended for him. In particular, the sender of the document can exploit this authentication in the case of subsequent dispute of the delivery of the document to the recipient.

According to particular characteristics, in the course of said step of authenticating the recipient, an acknowledgment of receipt is constructed and said method comprises a step of placing in memory, in each of the first and second memories, said acknowledgment of receipt in conjunction with a copy of said document.

By virtue of these provisions, the two parties to the correspondence can verify the date of delivery of the copy of the document to the recipient and be assured of this delivery of copy.

According to particular characteristics, the first and second memories are situated in the same data center.

By virtue of these provisions, the steps of placing in memory may also be made secure.

According to particular characteristics, the method such as succinctly set forth above comprises a step of transmitting, to a third remote memory, a copy of the document.

By virtue of these provisions, a third party, for example a bailiff, can perform a sequestration of the copy of the document and vouch for the content of the document created by the sender of the document.

According to particular characteristics, the method such as succinctly set forth above comprises a step of authenticating an operator, a step of associating, in memory, a file with a copy of the document, a step of time-stamping said associating step and a step of assigning, to said file, an identifier of said operator and time-stamping data of said associating step.

By virtue of these provisions, if an operator has to intervene on a document, its identifier, the date and the time of the operation will be known.

According to particular characteristics, in the course of the step of creating a document, attributes representative of conditions of authentication of the recipient are allocated to said document.

By virtue of these provisions, the conditions of delivery of a copy of the document to the recipient of the document are associated and document and limit a risk of error of delivery without the authentication requested by the sender of the document.

According to particular characteristics, preliminarily to the step of creating a document, a step of authenticating the sender of the document is performed.

By virtue of these provisions, the recipient of a document may be assured of the identity of the sender of this document.

According to particular characteristics, the method such as succinctly set forth above comprises a step of associating with the document an integrity certificate rendering any subsequent modification of said document detectable, said integrity certificate being stored, in the first and second memories, in conjunction with the copies of said document.

By virtue of these provisions, each party to the correspondence can verify that the document has not been modified between its creation and its delivery to the recipient or its subsequent consultation.

According to a second aspect, the present invention is aimed at a device for securing data transfer, characterized in that it comprises:
- a means for creating a document by a document sender,
- a means for identifying at least one recipient of said document,
- a means for placing the document in memory in a first memory accessible by the sender of the document but not accessible by a recipient of the document,
- for each recipient of the document, a means for placing the document in memory in a second memory accessible by said recipient of the document but not accessible by the sender of the document and
- a means for transmitting to each recipient of the document an information item representative of the existence of the document at the disposal thereof in a second memory.

According to a third aspect, the present invention is aimed at a method for securing data transfer, characterized in that it comprises:
- a step of creating a document by a document sender,
- a step of identifying at least one recipient of said document, said identifying comprising the determination of at least one electronic address of said recipient and of at least one postal address of said recipient,
- a step of storing the document and the identification of each recipient,
- a step of electronic transmission, to at least one electronic address of each recipient of the document, of an information item representative of the existence of the document at the disposal thereof,
- for at least one recipient of the document, a step of determining whether the elapsed duration since the step of electronic transmission and before the receipt of the document, by said recipient of the document, is greater than a predetermined duration and
- if, for said recipient of the document, the elapsed duration since the step of electronic transmission and before the receipt of the document, by said recipient of the document, is greater than a predetermined duration, a step of printing said document and of transmitting the printed document to a postal address of said recipient.

By virtue of these provisions, the sender of the document may be assured that the recipient of the document will be informed of the existence of the document intended for him, either by way of an electronic address, or by way of a postal address. The risks of non-transmission related to the difficulties of access of the recipient to the messages transmitted to one of his electronic addresses (for example electronic mailbox saturated, a fault with the host of this electronic address, obsolescence of the electronic address) are thus reduced.

According to a fourth aspect, the present invention is aimed at a device for securing data transfer, characterized in that it comprises:
- a means for creating a document by a document sender,
- a means for identifying at least one recipient of said document, said identifying comprising the determination of at least one electronic address of said recipient and of at least one postal address of said recipient,
- a means for storing the document and the identification of each recipient,
- a means of electronic transmission, to at least one electronic address of each recipient of the document, of an information item representative of the existence of the document at the disposal thereof,
- for at least one recipient of the document, a means for determining whether the elapsed duration since the step of electronic transmission and before the receipt of the document, by said recipient of the document, is greater than a predetermined duration and
- a means for printing which, if, for said recipient of the document, the elapsed duration since the step of electronic transmission and before the receipt of the document, by said recipient of the document, is greater than a predetermined duration, is able to print said document, and for transmitting the printed document, to a postal address of said recipient.

According to a fifth aspect, the present invention is aimed at a method for securing data transfer, characterized in that it comprises:
- a step of attempted transmission of a document from a document sender destined for at least one document recipient, by implementing at least one transmission attribute and
- for at least one step of attempted transmission, a step of evaluating the value of at least one transmission attribute and
- a step of placing at the disposal of the sender, the evaluation of the value of the transmission attribute.

By virtue of these provisions, the sender can estimate the quality of service or the risk for the next attempted transmission to said recipient. For example, the sender can estimate the value of an electronic address and the reliability of the recipient's documents reception service and decide to modify the way in which he will transmit new documents to this recipient.

According to a sixth aspect, the present invention is aimed at a d10—Device for securing data transfer, characterized in that it comprises:
- a means for performing an attempted transmission of a document from a document sender destined for at least one document recipient, by implementing at least one transmission attribute and
- for at least one step of attempted transmission, an evaluation means suitable for evaluating a value of at least one transmission attribute and
- a means for placing at the disposal of the sender, the evaluation of the value of the transmission attribute.

According to a seventh aspect, the present invention is aimed at a method for securing data transfer, characterized in that it comprises:
- a step of so-called "weak" identification of a user in the course of which said user provides one or more electronic addresses,
- a step of message transmission from said user or to said user, by implementing said first identification,
- a step of so-called "strong" identification of a user, in the course of which said user provides proof of his identity and a pair of asymmetric keys is allocated to him and
- a step of transmitting messages, from said user or to said user, by implementing said pair of asymmetric keys.

By virtue of these provisions, a user can accustom himself to the use of an electronic signature and transmit or receive weakly secured confidential messages, and then pass to a level of strong authentication in which his identity is guaranteed to his correspondents.

According to an eighth aspect, the present invention is aimed at a device for securing data transfer, characterized in that it comprises:

- a means of so-called "weak" identification of a user in the course of which said user provides one or more electronic addresses,
- a means of message transmission from said user or to said user, by implementing said first identification,
- a means of so-called "strong" identification of a user, in the course of which said user provides proof of his identity and a pair of asymmetric keys is allocated to him and
- a means for transmitting messages, from said user or to said user, by implementing said pair of asymmetric keys.

According to a ninth aspect, the present invention is aimed at a method for securing data transfers, characterized in that it comprises:

- a step of assigning values of trusted attributes to a process for transferring data from a document sender to a document recipient,
- a step of editing a document, by a document sender, in the course of which the document sender defines at least one recipient and values of trusted attributes required for the transmission of said document and
- for each recipient for which the values of trusted attributes assigned to the process for transferring data from the sender to this recipient are all greater than the required values, a step of transmitting said document to said recipient.

By virtue of these provisions, the sender of a document can choose the level of quality of service which must be associated with the transmission of a document to a recipient. For example, a document judged to be very important or very confidential will be transmitted to a recipient only with strong authentication of this recipient or only for a predetermined duration whereas a document judged to be of lesser importance or of lesser confidentiality, for example an important document copy transmitted, for information, to a third party, will be delivered to its recipient with less strict authentication of this recipient or for a longer duration.

According to a tenth aspect, the present invention is aimed at a device for securing data transfers, characterized in that it comprises:

- a means for assigning values of trusted attributes to a process for transferring data from a document sender to a document recipient,
- a means for editing a document, by a document sender, in the course of which the document sender defines at least one recipient and values of trusted attributes required for the transmission of said document and
- a transmission means able, for each recipient for which the values of trusted attributes assigned to the process for transferring data from the sender to this recipient are all greater than the required values, to transmit said document to said recipient.

According to an eleventh aspect, the present invention is aimed at a method for securing data transfer, characterized in that it comprises:

- a step of composing a document, by a sender, by implementing a template preserved on a server,
- a step of verification of compliance, by said document, with predetermined criteria,
- a step of placing said document in memory,
- a step of verifying that the placing of said document in memory complies with predetermined criteria,
- a step of communicating to each recipient of the document, a message informing same of the existence of a document which is intended therefor,
- a step of attempted access to said document, by a recipient of said document,
- a step of verifying that said attempted access complies with predetermined criteria and
- in the case where the attempted access complies with predetermined criteria, a step of transmitting said document to said recipient.

By virtue of these provisions, the whole of the process of composition, archiving and transmission to the recipient is performed under the check of compliance with predetermined criteria, thereby guaranteeing a high level of quality of service to the sender of the document.

According to a twelfth aspect, the present invention is aimed at a device for securing data transfer, characterized in that it comprises:

- a means for composing a document, by a sender, by implementing a template preserved on a server,
- a means for verifying compliance, by said document, with predetermined criteria,
- a means for placing said document in memory,
- a means for verifying that the placing of said document in memory complies with predetermined criteria,
- a means for communicating to each recipient of the document, a message informing same of the existence of a document which is intended therefor,
- a means for performing an attempted access to said document, by a recipient of said document,
- a means for verifying that said attempted access complies with predetermined criteria and
- a transmission means able, in the case where the attempted access complies with predetermined criteria, to transmit said document to said recipient.

According to a thirteenth aspect, the present invention is aimed at a method for securing data transfer, characterized in that it comprises:

- a step of creating a document by a document sender,
- a step of identifying at least one recipient of said document, said identifying comprising the determination of at least one electronic address of said recipient and of at least one postal address of said recipient,
- a step of storing the document and the identification of each recipient,
- a step of electronic transmission, to at least one electronic address of each recipient of the document, of an information item representative of the existence of the document at the disposal thereof,
- for at least one recipient of the document, a step of determining whether the elapsed duration since the step of electronic transmission and before the receipt of the document, by said recipient of the document, is greater than a predetermined duration and
- if, for said recipient of the document, the elapsed duration since the step of electronic transmission and before the receipt of the document, by said recipient of the document, is greater than a predetermined duration, a step of printing said document and of transmitting the printed document to a postal address of said recipient.

By virtue of these provisions, the sender of the document may be assured that the recipient of the document will be informed of the existence of the document intended for him, either by way of an electronic address, or by way of a postal address. The risks of non-transmission related to the difficulties of access of the recipient to the messages transmitted to one of his electronic addresses (for example electronic mailbox saturated, a fault with the host of this electronic address, obsolescence of the electronic address) are thus reduced.

According to particular characteristics, the method such as succinctly set forth above comprises:
- a step of placing a copy of the document in memory in a first memory accessible by the sender of the document but not accessible by a recipient of the document and
- for each recipient of the document, a step of placing a copy of the document in memory in a second memory accessible by said recipient of the document but not accessible by the sender of the document.

By virtue of these provisions, each one, of the sender and of the recipient, has available a memory where the documents, for which they have been, respectively, sender and recipient, are archived. Each of them therefore has an original and can have it archived in a location of his choice, without running the risk of interfering with the other original.

Thus, if there exists a break in correspondence between two facilities, or right inside a double-entry operation, the error will be detected and repaired.

According to particular characteristics, the method such as succinctly set forth above comprises a step of time-stamping each step of placing a copy of the document in memory.

By virtue of these provisions, each party to the correspondence can verify the date of placing in memory of the copy of the document in the memory reserved therefor.

According to particular characteristics, the method such as succinctly set forth above comprises a step of authenticating the recipient and, in the case of positive authentication, a step of access, by said recipient, to the document intended for him.

By virtue of these provisions, the sender of the document can impose an authentication of the recipient before the latter becomes aware of the document intended for him. In particular, the sender of the document can exploit this authentication in the case of subsequent dispute of the delivery of the document to the recipient.

According to particular characteristics, in the course of said step of authenticating the recipient, an acknowledgment of receipt is constructed and said method comprises a step of placing in memory, in each of the first and second memories, said acknowledgment of receipt in conjunction with a copy of said document.

By virtue of these provisions, the two parties to the correspondence can verify the date of delivery of the copy of the document to the recipient and be assured of this delivery of copy.

According to particular characteristics, the method such as succinctly set forth above comprises a step of transmitting, to a third remote memory, a copy of the document.

By virtue of these provisions, a third party, for example a bailiff, can perform a sequestration of the copy of the document and vouch for the content of the document created by the sender of the document.

According to particular characteristics, the method such as succinctly set forth above comprises a step of authenticating an operator for printing and transmitting the printed document to said postal address, a step of transmitting said document to said operator, a step of time-stamping said step of transmitting to the operator and a step of associating, with said document, an identifier of said operator and time-stamping data of said step of transmitting to the operator.

By virtue of these provisions, if an operator has to intervene on a document, its identifier, the date and time when responsibility therefor was taken are known.

According to particular characteristics, in the course of the step of creating a document, attributes representative of conditions of authentication of the recipient are allocated to said document.

By virtue of these provisions, the conditions of delivery of a copy of the document to the recipient of the document are associated and document and limit a risk of error of delivery without the authentication requested by the sender of the document.

According to particular characteristics, preliminarily to the step of creating a document, a step of authenticating the sender of the document is performed.

By virtue of these provisions, the recipient of a document may be assured of the identity of the sender of this document.

According to particular characteristics, the method such as succinctly set forth above comprises a step of associating with the document an integrity certificate rendering any subsequent modification of said document detectable, said integrity certificate being stored, in the first and second memories, in conjunction with the copies of said document.

By virtue of these provisions, each party to the correspondence can verify that the document has not been modified between its creation and its delivery to the recipient or its subsequent consultation.

According to particular characteristics the method such as succinctly set forth above comprises:
- a step of attempted transmission of a document from a document sender destined for at least one document recipient, by implementing at least one transmission attribute and
- for at least one step of attempted transmission, a step of evaluating the value of at least one transmission attribute and
- a step of placing at the disposal of the sender, the evaluation of the value of the transmission attribute.

By virtue of these provisions, the sender can estimate the quality of service or the risk for the next attempted transmission to said recipient. For example, the sender can estimate the value of an electronic address, the reliability of the recipient's documents reception service and decide to modify the way in which he will transmit new documents to this recipient.

According to particular characteristics the method such as succinctly set forth above comprises:
- a step of so-called "weak" identification of a user in the course of which said user provides one or more electronic addresses,
- a step of message transmission from said user or to said user, by implementing said first identification,
- a step of so-called "strong" identification of a user, in the course of which said user provides proof of his identity and a pair of asymmetric keys is allocated to him and
- a step of transmitting messages, from said user or to said user, by implementing said pair of asymmetric keys.

By virtue of these provisions, a user can accustom himself to the use of an electronic signature and transmit or receive weakly secured confidential messages, and then pass to a level of strong authentication in which his identity is guaranteed to his correspondents.

According to particular characteristics the method such as succinctly set forth above comprises:
- a step of assigning values of trusted attributes to a process for transferring data from a document sender to a document recipient,
- a step of editing a document, by a document sender, in the course of which the document sender defines at least one recipient and values of trusted attributes required for the transmission of said document,
- for each recipient for which the values of trusted attributes assigned to the process for transferring data from the sender to this recipient are all greater than the required values, a step of transmitting said document to said recipient and for each recipient for which the values of trusted attributes assigned to the process for transferring data from the sender to this recipient are not all greater than the required values, the step of printing the document and of transmitting the printed document by post.

By virtue of these provisions, the sender of a document can choose the level of quality of service which must be associated with the transmission of a document to a recipient. For example, a document judged to be very important or very confidential will be transmitted to a recipient only with strong authentication of this recipient or only for a predetermined duration whereas a document judged to be of lesser importance or of lesser confidentiality, for example an important document copy transmitted, for information, to a third party, will be delivered to its recipient with less strict authentication of this recipient or for a longer duration.

According to a fourteenth aspect, the present invention is aimed at a device for securing data transfer, characterized in that it comprises:

- a means for creating a document by a document sender,
- a means for identifying at least one recipient of said document, said identifying comprising the determination of at least one electronic address of said recipient and of at least one postal address of said recipient,
- a means for storing the document and the identification of each recipient,
- a means of electronic transmission, to at least one electronic address of each recipient of the document, of an information item representative of the existence of the document at the disposal thereof,
- for at least one recipient of the document, a means for determining whether the elapsed duration since the step of electronic transmission and before the receipt of the document, by said recipient of the document, is greater than a predetermined duration and
- a means for printing able, if, for said recipient of the document, the elapsed duration since the step of electronic transmission and before the receipt of the document, by said recipient of the document, is greater than a predetermined duration, to print said document and for transmitting the printed document, to a postal address of said recipient.

The advantages, aims and characteristics of this device being similar to those of the method which is the subject of the first aspect, such as succinctly set forth above, they are not recalled here.

According to a fifteenth aspect, the present invention is aimed at a method for securing data transfer, characterized in that it comprises:

- a step of attempted transmission of a document from a document sender destined for at least one document recipient, by implementing at least one transmission attribute and
- for at least one step of attempted transmission, a step of evaluating the value of at least one transmission attribute and
- a step of placing at the disposal of the sender, the evaluation of the value of the transmission attribute.

By virtue of these provisions, the sender can estimate the quality of service or the risk for the next attempted transmission to said recipient. For example, the sender can estimate the value of an electronic address, the reliability of the recipient's documents reception service and decide to modify the way in which he will transmit new documents to this recipient.

According to particular characteristics, in the course of the evaluation step, the evaluation is dependent on the correspondence anomalies observed for each transmission attempt.

According to particular characteristics, in the course of the evaluation step, the evaluation is, furthermore, dependent on the elements provided by the recipient in the course of a step of registering with a service for the electronic transmission of documents.

According to particular characteristics, the method comprises, furthermore, a step of evaluating the identification of the sender of said document and, upon access to the document by the recipient, a step of providing the recipient with the evaluation of the identification of the sender.

According to particular characteristics, the method such as succinctly set forth above comprises:

- a step of placing a copy of the document in memory in a first memory accessible by the sender of the document but not accessible by a recipient of the document,
- for each recipient of the document, a step of placing a copy of the document in memory in a second memory accessible by said recipient of the document but not accessible by the sender of the document and
- a step of transmitting to each recipient of the document an information item representative of the existence of a copy of the document at the disposal thereof in a said second memory.

By virtue of these provisions, each one, of the sender and of the recipient, has available a memory where the documents, for which they have been, respectively, sender and recipient, are archived. Each of them therefore has an original and can have it archived in a location of his choice, without running the risk of interfering with the other original.

Thus, if there exists a break in correspondence between two facilities, or right inside a double-entry operation, the error will be detected and repaired.

According to particular characteristics, in the course of said step of authenticating the recipient, an acknowledgment of receipt is constructed and said method comprises a step of placing in memory, in each of the first and second memories, said acknowledgment of receipt in conjunction with a copy of said document.

By virtue of these provisions, the two parties to the correspondence can verify the date of delivery of the copy of the document to the recipient and be assured of this delivery of copy.

According to particular characteristics, in the course of a step of creating the document, attributes representative of conditions of authentication of the recipient are allocated to said document.

By virtue of these provisions, the conditions of delivery of a copy of the document to the recipient of the document are associated and document and limit a risk of error of delivery without the authentication requested by the sender of the document.

According to particular characteristics, the method such as succinctly set forth above comprises:

- a step of storing the document and the identification of each recipient,
- a step of electronic transmission, to at least one electronic address of each recipient of the document, of an information item representative of the existence of the document at the disposal thereof,
- for at least one recipient of the document, a step of determining whether the elapsed duration since the step of electronic transmission and before the receipt of the document, by said recipient of the document, is greater than a predetermined duration and if, for said recipient of the document, the elapsed duration since the step of electronic transmission and before the receipt of the document, by said recipient of the document, is greater than a predetermined duration, a step of printing said document and of transmitting the printed document to a postal address of said recipient.

By virtue of these provisions, the sender of the document may be assured that the recipient of the document will be informed of the existence of the document intended for him, either by way of an electronic address, or by way of a postal address. The risks of non-transmission related to the difficulties of access of the recipient to the messages transmitted to one of his electronic addresses (for example electronic mailbox saturated, a fault with the host of this electronic address, obsolescence of the electronic address) are thus reduced.

According to particular characteristics, the method such as succinctly set forth above comprises:
 a step of so-called "weak" identification of a user in the course of which said user provides one or more electronic addresses,
 a step of message transmission from said user or to said user, by implementing said first identification,
 a step of so-called "strong" identification of a user, in the course of which said user provides proof of his identity and a pair of asymmetric keys is allocated to him and
 a step of transmitting messages, from said user or to said user, by implementing said pair of asymmetric keys.

By virtue of these provisions, a user can accustom himself to the use of an electronic signature and transmit or receive weakly secured confidential messages, and then pass to a level of strong authentication in which his identity is guaranteed to his correspondents.

According to particular characteristics, the method such as succinctly set forth above comprises:
 a step of assigning values of trusted attributes to a process for transferring data from a document sender to a document recipient,
 a step of editing a document, by a document sender, in the course of which the document sender defines at least one recipient and values of trusted attributes required for the transmission of said document and
 for each recipient for which the values of trusted attributes assigned to the process for transferring data from the sender to this recipient are all greater than the required values, a step of transmitting said document to said recipient.

By virtue of these provisions, the sender of a document can choose the level of quality of service which must be associated with the transmission of a document to a recipient. For example, a document judged to be very important or very confidential will be transmitted to a recipient only with strong authentication of this recipient or only for a predetermined duration whereas a document judged to be of lesser importance or of lesser confidentiality, for example an important document copy transmitted, for information, to a third party, will be delivered to its recipient with less strict authentication of this recipient or for a longer duration.

According to a sixteenth aspect, the present invention is aimed at a device for securing data transfer, characterized in that it comprises:
 a means for performing an attempted transmission of a document from a document sender destined for at least one document recipient, by implementing at least one transmission attribute and
 for at least one step of attempted transmission, an evaluation means suitable for evaluating a value of at least one transmission attribute and
 a means for placing at the disposal of the sender, the evaluation of the value of the transmission attribute.

The advantages, aims and characteristics of this device being similar to those of the method which is the subject of the fifteenth aspect, such as succinctly set forth above, they are not recalled here.

According to a seventeenth aspect, the present invention is aimed at a method for securing data transfer, characterized in that it comprises:
 a step of so-called "weak" identification of a user in the course of which said user provides one or more electronic addresses,
 a step of message transmission from said user or to said user, by implementing said first identification,
 a step of so-called "strong" identification of a user, in the course of which said user provides proof of his identity and a pair of asymmetric keys is allocated to him and
 a step of transmitting messages, from said user or to said user, by implementing said pair of asymmetric keys.

By virtue of these provisions, a user can accustom himself to the use of an electronic signature and transmit or receive weakly secured confidential messages, and then pass to a level of strong authentication in which his identity is more strongly guaranteed to his correspondents.

According to particular characteristics, in the course of the weak identification step, a user provides at least one electronic, telephonic or postal address.

According to particular characteristics, in the course of the weak identification step, a password is dispatched to an address provided by the user.

According to particular characteristics, in the course of the weak identification step, a private certificate is provided to the user.

According to particular characteristics, said electronic certificate bears personal attributes of the member.

According to particular characteristics, in the course of the strong identification step, the user provides a hand-written signature on a paper document.

According to particular characteristics, in the course of the strong identification step, the user provides a qualified signature sent by a certifying authority.

According to particular characteristics, the method such as succinctly set forth above comprises a step of providing, by a first user, an address of a second user, to be registered, and, as soon as the second user has registered, a step of transmitting, to the first user, a message representative of the registration of the second user.

According to particular characteristics, the method such as succinctly set forth above comprises:
 a step of creating a document by a document sender,
 a step of identifying at least one recipient of said document,
 a step of placing a copy of the document in memory in a first memory accessible by the sender of the document but not accessible by a recipient of the document,
 for each recipient of the document, a step of placing a copy of the document in memory in a second memory accessible by said recipient of the document but not accessible by the sender of the document and
 a step of transmitting to each recipient of the document an information item representative of the existence of a copy of the document at the disposal thereof in a said second memory.

By virtue of these provisions, each one, of the sender and of the recipient, has available a memory where the documents, for which they have been, respectively, sender and recipient, are archived. Each of them therefore has an original and can have it archived in a location of his choice, without running the risk of interfering with the other original.

Thus, if there exists a break in correspondence between two facilities, or right inside a double-entry operation, the error will be detected and repaired.

According to particular characteristics, the method such as succinctly set forth above comprises a step of time-stamping each step of placing a copy of the document in memory.

By virtue of these provisions, each party to the correspondence can verify the date of placing in memory of the copy of the document in the memory reserved therefor.

According to particular characteristics, the method such as succinctly set forth above comprises a step of authenticating the recipient and, in the case of positive authentication, a step of access, by said recipient, to the copy of the document available in the second memory.

By virtue of these provisions, the sender of the document can impose an authentication of the recipient before the latter becomes aware of the document intended for him. In particular, the sender of the document can exploit this authentication in the case of subsequent dispute of the delivery of the document to the recipient.

According to particular characteristics, in the course of said step of authenticating the recipient, an acknowledgment of receipt is constructed and said method comprises a step of placing in memory, in each of the first and second memories, said acknowledgment of receipt in conjunction with a copy of said document.

By virtue of these provisions, the two parties to the correspondence can verify the date of delivery of the copy of the document to the recipient and be assured of this delivery of copy.

According to particular characteristics, the first and second memories are situated in the same data center.

By virtue of these provisions, the steps of placing in memory may also be made secure.

According to particular characteristics, the method such as succinctly set forth above comprises a step of transmitting, to a third remote memory, a copy of the document.

By virtue of these provisions, a third party, for example a bailiff, can perform a sequestration of the copy of the document and vouch for the content of the document created by the sender of the document.

According to particular characteristics, the method such as succinctly set forth above comprises a step of creating a document to be transmitted from a document sender to a recipient of the document, in the course of which the sender of the document selects a level of signature, weak or strong, necessary for the reception of said document by the recipient of the document and, during an attempted access to said document by the recipient, an authentication of the recipient is performed, implementing the signature of necessary level defined by the sender of the document.

By virtue of these provisions, the conditions of delivery of a copy of the document to the recipient of the document are associated and document and limit a risk of error of delivery without the authentication requested by the sender of the document.

According to particular characteristics, preliminarily to the step of creating a document, a step of authenticating the sender of the document is performed.

By virtue of these provisions, the recipient of a document may be assured of the identity of the sender of this document.

According to particular characteristics, the method such as succinctly set forth above comprises a step of associating with the document an integrity certificate rendering any subsequent modification of said document detectable, said integrity certificate being stored, in the first and second memories, in conjunction with the copies of said document.

By virtue of these provisions, each party to the correspondence can verify that the document has not been modified between its creation and its delivery to the recipient or its subsequent consultation.

According to particular characteristics, the method such as succinctly set forth above comprises:
  a step of creating a document by a document sender,
  a step of identifying at least one recipient of said document, said identifying comprising the determination of at least one electronic address of said recipient and of at least one postal address of said recipient,
  a step of storing the document and the identification of each recipient,
  a step of electronic transmission, to at least one electronic address of each recipient of the document, of an information item representative of the existence of the document at the disposal thereof,
  for at least one recipient of the document, a step of determining whether the elapsed duration since the step of electronic transmission and before the receipt of the document, by said recipient of the document, is greater than a predetermined duration and
  if, for said recipient of the document, the elapsed duration since the step of electronic transmission and before the receipt of the document, by said recipient of the document, is greater than a predetermined duration, a step of printing said document and of transmitting the printed document to a postal address of said recipient.

By virtue of these provisions, the sender of the document may be assured that the recipient of the document will be informed of the existence of the document intended for him, either by way of an electronic address, or by way of a postal address. The risks of non-transmission related to the difficulties of access of the recipient to the messages transmitted to one of his electronic addresses (for example electronic mailbox saturated, a fault with the host of this electronic address, obsolescence of the electronic address) are thus reduced.

According to particular characteristics, the method such as succinctly set forth above comprises:
  a step of attempted transmission of a document from a document sender destined for at least one document recipient, by implementing at least one transmission attribute and
  for at least one step of attempted transmission, a step of evaluating the value of at least one transmission attribute and
  a step of placing at the disposal of the sender, the evaluation of the value of the transmission attribute.

By virtue of these provisions, the sender can estimate the quality of service or the risk for the next attempted transmission to said recipient. For example, the sender can estimate the value of an electronic address, the reliability of the recipient's documents reception service and decide to modify the way in which he will transmit new documents to this recipient.

According to particular characteristics, the method such as succinctly set forth above comprises:
  a step of assigning values of trusted attributes to a process for transferring data from a document sender to a document recipient,
  a step of editing a document, by a document sender, in the course of which the document sender defines at least one recipient and values of trusted attributes required for the transmission of said document and for each recipient for which the values of trusted attributes assigned to the process for transferring data from the sender to this recipient are all greater than the required values, a step of transmitting said document to said recipient.

By virtue of these provisions, the sender of a document can choose the level of quality of service which must be associated with the transmission of a document to a recipient. For example, a document judged to be very important or very confidential will be transmitted to a recipient only with strong authentication of this recipient or only for a predetermined duration whereas a document judged to be of lesser importance or of lesser confidentiality, for example an important document copy transmitted, for information, to a third party, will be delivered to its recipient with less strict authentication of this recipient or for a longer duration.

According to an eighteenth aspect, the present invention is aimed at a device for securing data transfer, characterized in that it comprises:

a means of so-called "weak" identification of a user in the course of which said user provides one or more electronic addresses, a means of message transmission from said user or to said user, by implementing said first identification, a means of so-called "strong" identification of a user, in the course of which said user provides proof of his identity and a pair of asymmetric keys is allocated to him and a means for transmitting messages, from said user or to said user, by implementing said pair of asymmetric keys.

The advantages, aims and characteristics of this device being similar to those of the method which is the subject of the seventeenth aspect, such as succinctly set forth above, they are not recalled here.

The various aspects of the present invention are intended to be combined to form a complete solution for securing documents and/or messages communicated between people and/or computerized systems. In particular, the essential and particular characteristics of each of the aspects of the present invention form particular characteristics, or advantageous forms, of the other aspects of the present invention.

Figure 2A:
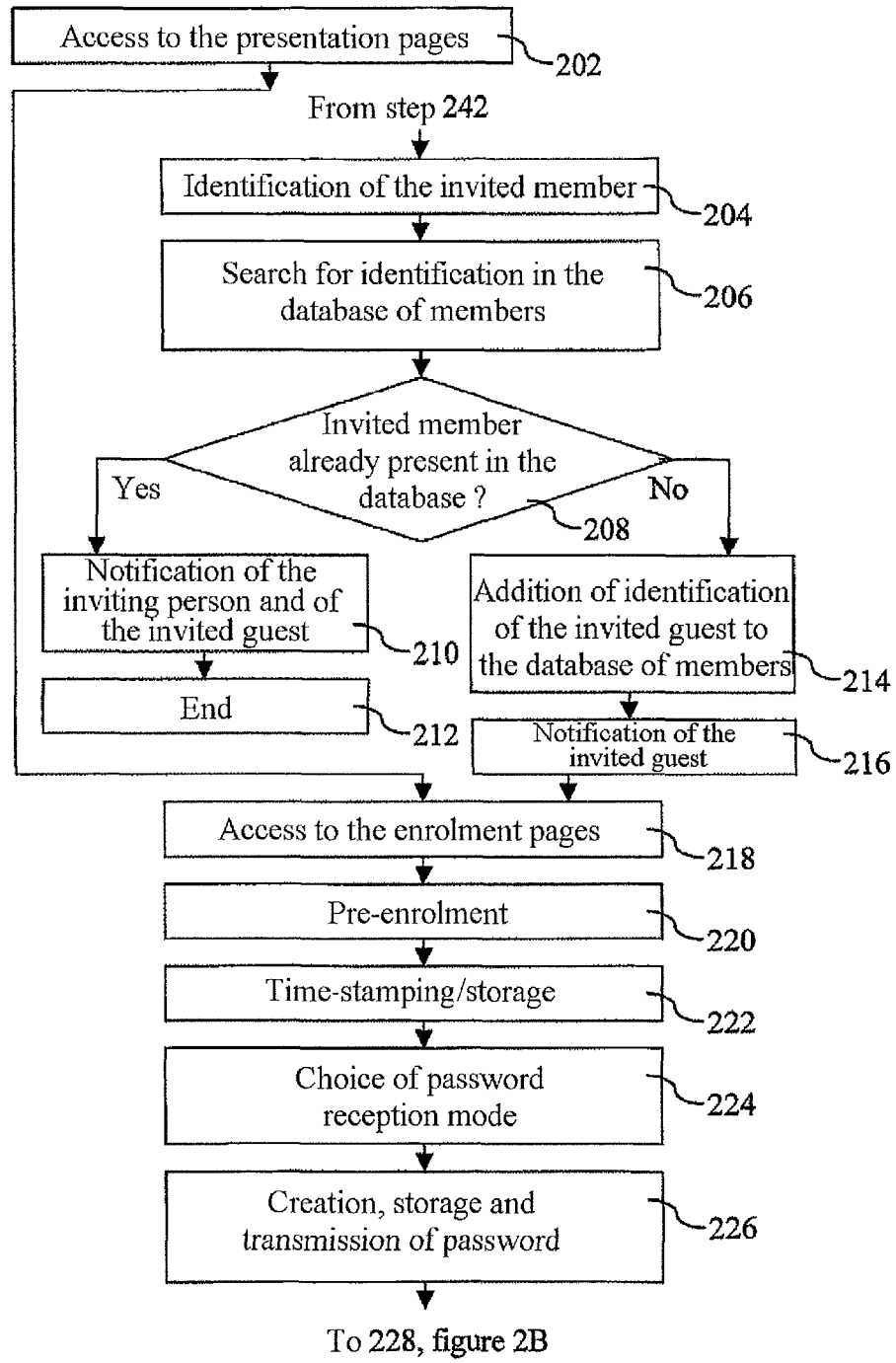
Figure 2B:
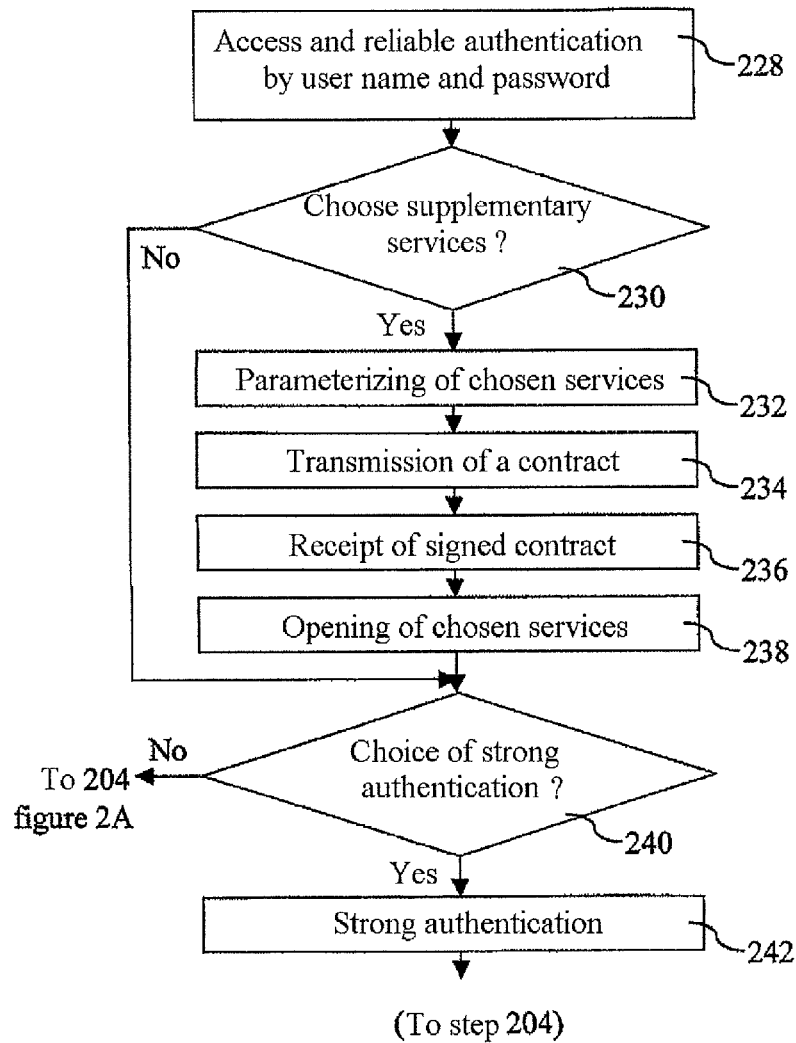
Figure 3B:
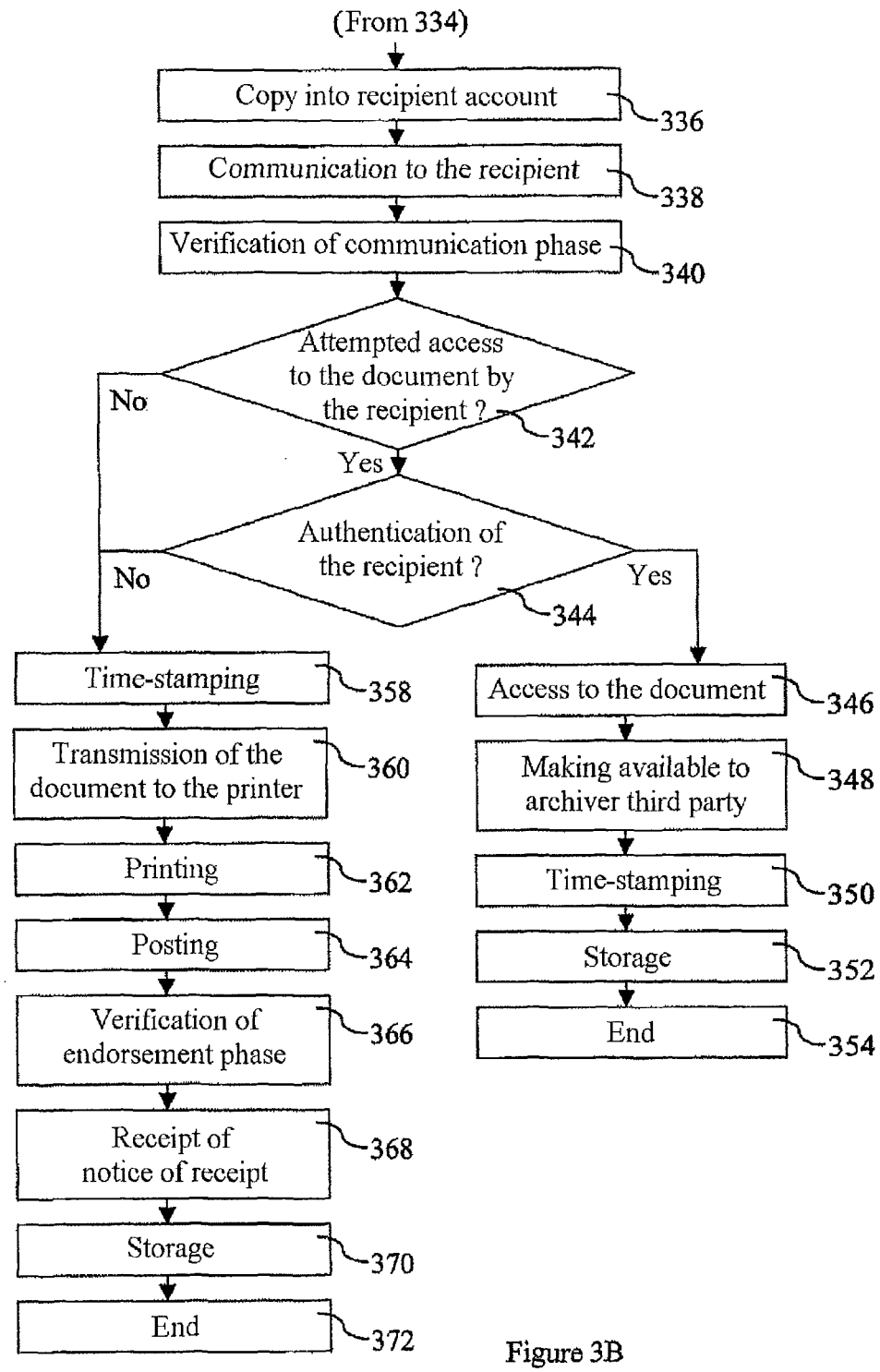
Figure 4:
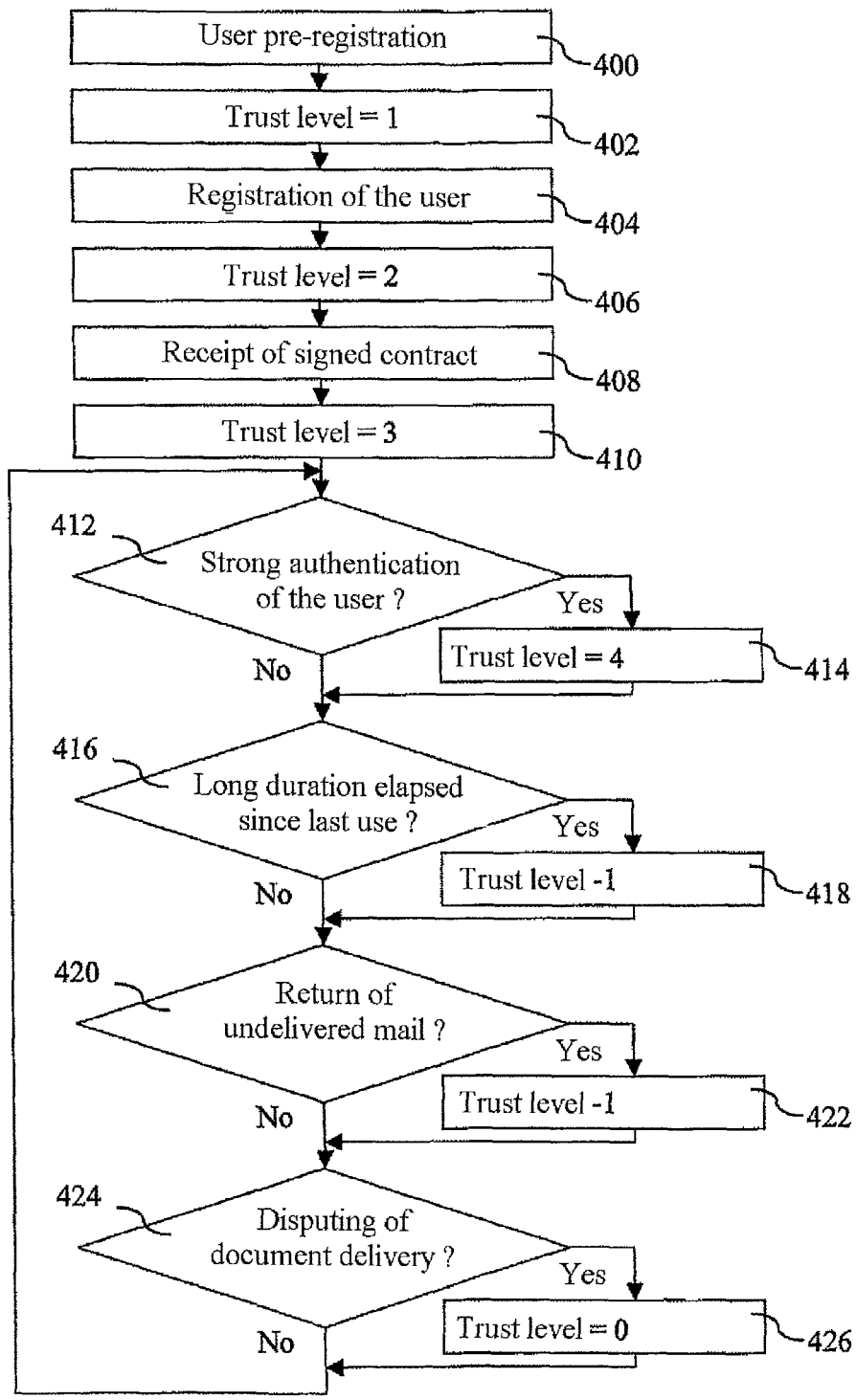

Other advantages, aims and characteristics of the present invention will emerge from the description which follows given, with an explanatory and wholly non-limiting aim, in regard to the appended drawings in which:

FIG. 1 represents, schematically, in the form of a functional diagram, a particular embodiment of the device which is the subject of the present invention, FIGS. 2A and 2B represent, in the form of a logic diagram, steps implemented during the registration of a user with the services offered by implementing a particular embodiment of the present invention, FIGS. 3A and 3B represent, in the form of a functional diagram, the functions implemented for transmission of a registered electronic document and FIG. 4 represents, in the form of a logic diagram, steps implemented for the evaluation of values of dynamic personal trusted attributes.

FIG. 1 depicts a service for securing data transfer 100 comprising a document composition service 102, a preservation service 104, a traceability service 106, a communication service 108, an endorsement service 110, a verification service 112, a scheduling service 114 and a utilization service 116. FIG. 1 also depicts a trusted third party network 118 utilizing registration offices 120, a trusted third party network 122, a sender 124 connected to a secure private office 126, a recipient 128 connected to a secure private office 130, a sender-archiving third party 132, a recipient-archiving third party 134 and a printer third party 136.

The service for securing data transfer 100 implements each of the aspects of the present invention. The document composition service 102 preserves templates or masks of documents furnished with attributes which are generic for all the users or specific for the users who have provided such templates of documents as well as their attributes. These attributes may be assigned to the document templates by way of a graphical user interface (not represented) in which menus and contextual aids allow the user to choose the attributes of the template according to their meaning and their effects. These so-called "trusted" attributes, which are described hereinbelow, relate to the identities of the senders and/or recipients of documents, the tasks or scheduling of the tasks, the checking and the validation of the processing operations performed on the documents arising from these templates and/or the security level required for the document.

When composing a document on the basis of a template, the sender user selects a template, provides the data to document the template, in particular at least one identification of the recipient, an electronic address and, preferably, a postal address of the recipient, if these elements are not already present in the document template, as well as the message to be transmitted to the recipient, for example the elements of a bill, of a contract, of a summons to attend a meeting.

The sender user can also, while composing this document, modify and supplement the attributes of the document template so as to constitute attributes of the document to be transmitted, for example its date of delivery to the recipient in electronic form, its date of delivery in postal form in the case of failure of the delivery in electronic form, its date of end of delivery to the recipient in electronic form, the level of authentication of the recipient necessary for the document.

It is observed that the document composition, an automatic system, for example a computer of the sender user can provide the elements necessary for composition, for example in the form of a spreadsheet file comprising these elements, in an ordered manner.

It is observed that, during one and the same document composition session, a plurality of documents may be composed manually or automatically.

When the document is ready to be transmitted, the sender user validates its transmission to the recipient.

The preservation service 104 preserves any document composed in a nonvolatile memory, access to which is reserved for the sender of the document. The conditions of access to this memory are defined with the sender user, according to known techniques, for example subject to provision of a user name (or "login") and of a password, or subject to electronic authentication. It is observed that the sender user can mandate an archiver third party 132 to automatically copy each document that he has composed. The preservation service 104 assigns a secure time-stamping to each document that it receives.

The traceability service 106 guarantees the traceability of the various steps performed on a document. For this purpose, it calculates an integrity certificate on the basis of the document composed in such a way that the integrity certificate makes it possible to detect any modification of the document composed. For example, the integrity certificate is based on a hash function which provides a condensed digest. The integrity certificate is, on the one hand, associated, by the preservation service 104, with the document placed in memory and, on the other hand, associated with an identification of the document composed, for example an identification of the sender user, of the recipient user and of the time-stamping of the end of the composition of the document, these elements being preserved by a trusted third party, for example a court bailiff.

The communication service 108 makes a copy of the document to be transmitted to the recipient in a nonvolatile memory solely accessible by this recipient, subject to compliance with the access conditions defined by the document's trusted attributes, with time-stamping of the copy. After access by the recipient, an archiver third party 134 mandated by this recipient can access the copy of the document and copy it.

The endorsement service 110 performs the choice of the channel of communication with the recipient (for example by electronic mail, minimessage, fax or post) and the communication to the recipient of at least one message warning him of the presence of a document for his attention. This communication is performed, preferably, in several steps, the ordering of which is defined by the attributes of the document to be transmitted. Generally, this communication begins, at a date defined by the sender and represented by at least one attribute of the document, in the form of an electronic message dispatched to an electronic address of the recipient. For example, this electronic message takes the form of an electronic mail dispatched to the electronic mail address (so-called "email address") or of a minimessage SMS (the acronym standing for "Short Message System") dispatched to the telephonic address (that is to say to the telephone number, generally a mobile) of the recipient.

The attributes of the document can provide that in the absence of access, by the recipient, within a period defined by at least one attribute of the document, to the document which is intended for him and which is preserved by the communication service 108, which then warns the endorsement service 108 thereof, at least one other message is transmitted to the recipient, by the communication service 108. In the absence of access, by the recipient, within a second period defined by at least one attribute of the document which is intended for him or right from the end of the second period, according to the sender user's settings represented by the attributes of this document, the endorsement service 110 transmits the document to the printer third party 136 with a view to the transmission of the document in the form of postal mail with or without requesting notice, or acknowledgment, of receipt.

The verification service 112 verifies, during each communication between two services, that all the necessary procedures have been performed correctly, and that all the information (document template, variable information of the document, attributes of the document, time-stamping, proper receipt by the recipient service and acknowledgment of receipt transmitted to the sender service, for example) pertinent to these procedures is sufficient and has indeed been processed. Each verification performed by the verification service 112 gives rise to a record transmitted to the traceability service 106, with a view to its traceability.

The scheduling service 114 plans all the tasks performed by the various services, some of these tasks being, as has been seen, parametrized as a function of the attributes associated with the documents.

The utilization service 116 schedules the operations performed on each document and, in particular, the calls to the external services, for example the third parties for archiving, authentication, traceability, printing, providing time-stamping.

The trusted third party networks 118 and 122 utilizing registration offices 120, or not respectively, provide the data necessary for verifying the validity of certificates for authenticating users or third parties, according to techniques known per se, notably in conjunction with the public key infrastructure known by the name PKI.

The registration offices are organs of the trusted third party. They ensure the appraisals and updating of the civil statuses with the personal numerical objects for the composition, transmission and legal preservation of the structured documents or files. Each registration office undertakes to protect these trusted attributes as well as their confidentiality. Together with its registration office, the trusted third party thereafter ensures the personal strong authentication of the users and the use of the numerical objects entrusted for an instant, termed the "instant of production" to the service providers chosen by each sender user. It ensures checking of the result of the operation carried out by the provider or documentary management operator, and, at this juncture, it verifies the restitution of the attributes or of the trusted objects which can be preserved only by the trusted third party.

The sender user 124 and the recipient user 128 are connected to their secure private office 126 and 130, respectively, these offices being virtual and implemented, remotely with secure access means (for example, by entry of user name and password, use of keys transmitted on mobile telephone or strong authentication, according to the variants or the modes of operation chosen by the customers or imposed by the procedures and the levels of the attributes assigned to the documents).

The printer third party 136 prints the document to be transmitted by post, places it in an envelope and delivers it to the postal services, with or without requesting notice of receipt (the latter being returned directly to the sender user).

Preferably, during his registration, a user provides identification elements (name, forename, electronic address, telephonic address, postal address) and is allocated a user name (or "login") and a password. To authenticate him, a password, for example random or dependent on the elements that he has provided, is dispatched to him, at his telephonic address, the user having to enter this password on his private virtual office to confirm his registration, the effect of this being that his telephonic address is verified. Then the user accepts an agreement of proof indicating the authentication level that he wishes to have when he accesses his virtual private office.

Examples of trusted attributes that may be assigned to a document and that may be implemented in the various services illustrated in FIG. 1 are given below.
- the numerical identity (also called "login"), identification attribute, serving for composition,
- the password or authentication certificate, identification attribute, serving for composition,
- the structured form and/or file, task or scheduling attribute, serving for composition,
- the internal procedure and/or the complementary wordings, checking and/or validation attribute, serving for composition,
- the external procedure and/or compulsory wording, checking and/or validation attribute, serving for composition, dematerialization and communication,
- the entitlement, identification attribute, serving for composition and communication,
- the secret code and/or the procuration, identification attribute, serving for dematerialization,
- the partners file (recipient) comprising the addresses of a recipient, identification attribute, serving for composition, dematerialization and endorsement,
- the notification address book comprising the addresses of the recipients, identification attribute, serving for composition, communication and endorsement, the correspondence current account, identification attribute, serving for dematerialization, the number of the electronic safe, identification attribute, serving for dematerialization, the rating of the numerical identity as a function of the on-line declaration and of the supporting documents or of the paper testimonials returned to the registration office (identity card, crossed cheque, etc.) with the wording "certified as per the original". The origin rating becomes dynamic since it varies as a function of the construction of the personal folder, of its evolution, and of the quality of the exchanges performed, as set forth with regard to FIG. 4. The failures in the correspondence, such as returns "does not live at the indicated address", can thus degrade the credibility of the legal abode or of the main residence held in the civil registry office and in the address book or partners file of the sender user, the public certifying authority, identification attributes, serving for dematerialization, the time-stamping, serving for composition, dematerialization, communication and endorsement and the type of document, able to take one of the following meanings: confidential, critical, registered with notice of receipt or simple.

Among the third parties whose services are not represented in FIG. 1, preferably, they comprise the following three types, generally in ASP mode (the acronym standing for "Application Service Provider"):

the CRM (the acronym standing for "customer relationship management") which provides an evaluation of the trust that can be placed in a user, the CPM (the acronym standing for "commercial paper management") for managing commercial documents and which performs factoring, credit transfer or securitization.

the TRM (the acronym standing for "treasury relationship management") which ensures the "payment authorizations" functions and may be connected to a proximity server specializing in transfers without movements of funds for the settlement of bills and entire assets with notification to the treasurers of legal entities, of the balances of their exchanges.

FIGS. 2A and 2B illustrate steps followed for registering users with the secure communication services implementing the various aspects of the present invention. FIG. 2A depicts a step 202 in the course of which a user who is not yet a member accesses an item describing the service offering, for example on a web site. If he decides to take up membership of one of the proposed services, he goes to step 218.

For invited users, in the course of a step 204, a user who is already a member provides an identification of an invited member to whom he wishes to forward secure documents. This identification comprises at least one electronic address of the invited member. In the course of a step 206, the identification of the invited member is compared with the identifications of members already cataloged in the database of members so as to verify that he is not already a member.

In the course of a step 208, it is determined whether the invited member is already referenced in the database of users.

If the invited user is already a member, in the course of a step 210, this member state is notified to the inviting user and the invited user is notified that the inviting user desired to register him. The phase of registering the invited user is then completed in step 212.

If the invited user is not already a member, in the course of a step 214, his identification is added to this database and is assigned a status of pre-registered and a minimum rating corresponding to the members declared by third parties. Next, in the course of a step 216, an electronic mail is addressed to the invited member to indicate to him which member is inviting him to register with the secure communication service, that the document reception service is free of charge and to what electronic address, known by the name URL (the acronym standing for "universal resource locator"), he should go, for example by clicking on a link inserted into the electronic mail, to register free of charge with the secure communication service.

In the course of a step 218, the future member accesses the web site corresponding to this URL electronic address and, in the course of a step 220, pre-registers. For this purpose, in the course of step 220, he provides or validates his name, his forename, his postal address (professional and/or personal), his fixed telephone number, his fax machine number, his mobile telephone number. During validation of this information he accesses his membership number and a membership contract, the general conditions of the documents reception service and his user name, which he can optionally modify. Step 220 is time-stamped and the details provided are recorded in the database of users, in the course of a step 222.

In the course of a step 224, the future user chooses a mode of reception of his password, for example between reception by fax, by minimessage or by post.

In the course of a step 226, a password is allocated to the user, placed in memory in the database of users and transmitted to the user according to the mode of reception that he has chosen with an invitation to validate his registration by accessing his secure virtual private office.

When he accesses this office, the new user provides his user name and the password which was transmitted to him, in the course of step 228. In the course of a step 230, the user determines whether he wishes to use proposed services other than the simple reception of documents. If not, he goes to step 240. If he wishes to use more than the document reception service, the user chooses, in the course of a step 232, the parameters of the services that he wishes to use. In particular, the user provides the identity, the postal address and electronic address or addresses of the people entitled, within his organization, to send or receive documents, empowerments for these people, the particulars of the archiver third party, if any, that he wishes to see take a copy of the documents sent or received, the means for paying for the facilities that he wishes to use, the elements of personal signature and the signature levels that he can and wishes to implement.

For all these extra facilities, in the course of a step 234, a written service contract is transmitted to the user electronically and by post, he being requested to return, by post, a signed version.

In the course of a step 236, the contract return, signed by the user, is received, verified and recorded and the facilities chosen by the user become accessible to him, on the basis of a step 238. Next comes step 240, in the course of which the new user decides whether he wishes to benefit from a strong authentication. If so, in the course of a step 242, his strong authentication is undertaken in a manner known per se. If not, or at the end of step 242, step 204 is accessed so that the new user can invite new members.

FIG. 3A depicts that after having registered, in the course of a step 300 detailed in FIGS. 2A and 2B, the user having rights of access to the service for dispatching registered documents may decide to dispatch a document to a recipient. In this case, after being identified, in the course of a step 302, the user sending a registered document provides the identification of the recipient of the document. It is noted that if this recipient is not referenced in the database of users of the service, he is notified to the sender and a detailed registration step is performed from step 204, in FIGS. 2A and 2B.

In the course of a step 304, attributes are associated with the sender and recipient users.

Next, in the course of a step 306, the sender user can construct a document template, step 306, or access a document template which corresponds to him, that is to say a generic template available for all the sender users or a template that he has provided and which has been validated, step 308. In each of these cases, document attributes are associated with the document template, in the course of a step 310, by default and/or by user choice.

In the course of a step 312, the sender user composes the document to be transmitted to the recipient, that is to say he provides extra data to edit a document. Thereafter, the sender user chooses a security level required for the transmission of the document to the recipient, in the course of a step 316.

These data, documents, delivery conditions and particulars of the sender and recipient users are assigned trusted attributes attached to the template, to the sender and/or to the recipient, in the course of a step 318.

The document to be transmitted is validated by the sender user, in the course of a step 320 and the end of the composition of the document is time-stamped, in the course of a step 322. Thereafter, the document is signed by the sender user in the course of a step 324.

Next, the composed and signed document passes through a function for validating its content, composition procedures and attached attributes, in the course of a step 326. If this verification is negative, the sender user is warned of the problem and an alert is transmitted to the services manager.

If the verification of the composition is positive, a unique dispatch number and unique bar code are assigned to the document composed in the course of step 326. Next, in the course of a step 328, the composed, signed and verified document is transmitted, with its information and attached attributes, to the electronic safe of the sender, step 330.

In the course of a step 332, the procedures followed during the archiving phase and their results are verified.

In the course of a step 334, a legal deposition of the document and of the attachments is performed at a third party, for example a bailiff, who returns a legal deposition number.

In the course of a step 336, a copy of the document archived in the electronic safe of the sender is archived in a memory solely at the disposal of the recipient, which memory is called the "current account".

A message is thereafter transmitted to the recipient, immediately or on the date chosen by the sender, through the channel that the recipient has chosen, to warn him of the presence of a document for his attention and a message is transmitted by electronic mail, to the sender to inform him of the placing of the document at the disposal of the recipient, in the course of a step 338.

In the course of a step 340, the procedure and the results of the communication step are verified.

If the recipient attempts to access the document, during a predetermined period, step 342, the recipient is authenticated, step 344. If at the end of the predetermined period the recipient has not attempted to access the document or if his authentication has failed, a step 358 is entered.

On the other hand, if, before the end of the predetermined period, the recipient has attempted to access the document and has been authenticated, in the course of a step 346, the recipient accesses the document and the latter is placed at the disposal of an archiver third party of the recipient's choice, step 348.

The access to the document is time-stamped in the course of a step 350 and stored in the course of a step 352, the document transmission procedure then being completed in step 352.

In the course of step 358, the end of the predetermined period is time-stamped and, in the course of a step 360, the document is transmitted to a printer. The printer performs the printing, step 362 and the posting 364, taking account of any request for notice of receipt expressed by the sender.

In the course of a step 366, the procedures followed and the results of the endorsement phase are verified.

Upon receipt of the notice of receipt or notification of non-delivery of the document by the postal services, in the case where they are returned to the service provider, this event is time-stamped, step 368 and stored, step 370, the procedure then being completed in step 372.

All the storage steps set forth above are carried out in the sender's safe, in the recipient's current account and at the third party ensuring the traceability of the document transmission steps.

Preferably, the acknowledgment of receipt is, likewise, the subject of a legal deposition which is notified at one and the same time to the sender and to the recipient.

As a variant, the paper acknowledgment of receipt is returned directly, by the postal services, to the sender of the document.

It is observed, in FIG. 4 that, after the step of preregistering a user, step 400, the attribute representing the level of trust related to this user takes the value 1, step 402. After the step of registering the user, step 404, the level of trust takes the value 2, step 406. On receipt of the service contract signed by the user, step 408, the level of trust takes the value 3, step 410.

It is then determined whether the user performs a step of providing a strong electronic authentication, in the course of a step 412. If so, the level of trust associated with the user takes the value 4 in the course of a step 414. Otherwise or at the end of step 414, in the course of a step 416, it is determined whether a long duration, for example greater than three months, has elapsed since the last use of the services by the user. If such is the case, in the course of a step 418, the level of trust associated with this user is decremented by 1, it having to be noted that each new use of the service by the user restores his earlier level of trust.

Otherwise or at the end of step 418, in the course of a step 420, it is determined whether an item of postal mail which was dispatched to him has not been issued to the recipient. If such is the case, in the course of a step 422, the level of trust associated with the user is decremented by 1.

Otherwise or at the end of step 422, in the course of a step 424, it is determined whether the user has contested the delivery of a document. If so, the level of trust associated with the user takes the value "0". Otherwise, or at the end of step 426, step 412 is returned to.

As is understood with regard to FIG. 4, each user is allocated a dynamic level of trust, which evolves in the course of time, according to the events which affect his relationships with the proposed services.

This level of trust associated with a potential recipient of a document is used to aid the sender user or the automatic service to choose the conditions of identification or delivery of a document to the recipient, for example the period separating the electronic communication of a notification of presence of a document at the disposal of the recipient and the transmission of the document to a printer or the authentication level required to be able to access a document.

Thus, the device which is the subject of the present invention and the method that it implements guarantee the entirety of the aforementioned processes in such a way as to guarantee that no gap in security, confidentiality and authenticity exists throughout the exchanges and operations carried out between trusted third party network and the provider. Moreover, any anomaly may be regularized retroactively either on the same computerized site or on two remote sites. The mode of operation guarantees interoperability under the assumption that the various operations of the "documentary value chain" are carried out by several providers around the trusted third party network, for example, billing provider and legal archiving provider.

The implementation of the present invention thus provided, through its mode of operation:
- a guarantee of security (certification, encryption),
- a guarantee of confidentiality (encipherments of content and container),
- a guarantee of dynamic identity,
- a guarantee of file integrity,
- a guarantee of compliance (compulsory procedures and wordings),
- a guarantee of legality (legal or fiscal provisions EDI, XML, signature),
- a guarantee of probative legal value (trusted third party registration),
- a guarantee of traceability (tracking of operations),
- a guarantee of pairing or of backing of mail (legal folders),
- a guarantee of interoperability (inter trusted services providers).

The verification server 112 records the tasks carried out (it provides a summary list of the tasks) by the four modules (document composition service 102, preservation service 104, communication service 108 and an endorsement service 110), whatever their geographical locations (centralized or delocalized) with the requests in relation to the trusted third party so as to verify:
- the identity of the owner,
- the identity of the empowered executives,
- the personal entitlements (specific tasks),
- the forms deposited,
- the procedures for the forms,
- the logins/passwords,
- the partner or counterpart files,
- the choice of signature (PES, MES, QES, explained further on) and
- the procuration of encipherment with the secret code.

If the documents are processed in a dispersed manner and off-line with broken batches, the consolidation of the tasks makes it possible to note anomalies, and to retrieve the documents overdue.

The present invention implements the concept of "period of value", which means to say that the period, for example of twelve hours, of validity of an item of mail to be transmitted, to an insured individual for example, will be able to automatically terminate uncompleted tasks and trigger an alert at the document sender.

The tasks lists or "jobs lists" are transmitted in very secure mode by the "flowtrack" technology, which ensures the checks of the operator entitled to perform a task, of the pair of machines in communication with one another, of the encryption task and of blocking in case of non-compliance. This technology makes it possible to schedule the tasks with the trusted attributes necessary in relation to each operator and operator function with a time-stamping, a print, for example of "shal" type, the transmission pair (trusted third party/operator) and the name or the function of the machine or of the server addressed (composition, switching, archiving, endorsement, communication). Any anomaly in the scheduling outputs an alert or a scheduling shutdown. The processing of the scheduling streams is "parallelized" so as to manage the scalability of the documentary processing operations with probative legal value.

Preferably, certain information is not recorded in any case (for example information such as user name and password or the encipherment/secret code procuration) but the system stores (or "logs") the result of the operation or of the check. Of course this information is time-stamped.

The most critical operations may be bracketed in the "log" memory: the start of an operation, the end of an operation and the result status. This strengthens the validity of the information. For example, for the time-stamping of a signature of a document, the condensed digest, or "hash", of the document is time-stamped (and a secure proof of possession is obtained) and then the condensed digest is signed and the result is time-stamped (and thus a specific signature interval is obtained).

It is observed that if a mechanism of a type known by the person skilled in the art by the name "syslog" is used, it is preferable:
- to implement a secure communication protocol (even if everything is in the same white room) with checking of "the identity" of the machines concerned,
- to "sign" the stored data or "logs", through a symmetric signature procedure, the signature key being generated at regular intervals and exchanged through an encrypted process,
- to countersign the data stored at regular time intervals with an asymmetric signature.

The symmetric signatures, and asymmetric counter-signatures, may be recorded in a specific log, thereby making it possible not to disturb the content of the information log. The centralized logs must be recorded on two different machines in real time.

The fact of storing centrally does not make it permissible not to store locally, on the machine which carries out the operation. On the other hand, the local logs do not need to be strengthened.

Finally all the participating machines must be synchronized in time ("time-synchronous").

In give, throughout the end of the description, information complementary to the information given above, to constitute particular embodiments or variants of the embodiments set forth above.

The dematerialization system is a set of sub-systems obeying a scheme for processing computer data guaranteeing:
- the creation of a multitude of different documents: forms, structured files,
- the verification of the discriminating notable characters: trusted attributes, rules, procedures,
- the switching of the management information: double-entry exchanges,
- the symmetric preservation of proofs: bilaterality of the archived originals and
- the distributing of the requested services: copies, sharing of data.

In the case of implementing an architecture which is centered on a web server (or "web-centric") with delocalized legal functions, the uniqueness of the platform is ensured by two agents acting in the same data center so as not to take any operational risk regarding the transfer of information.

The recording of the numerical identities and person-based or enterprise-based management rules is "web-centric" or supra-national, in the same way as the composition of documents and the switching of messages necessary for management.

On the other hand, from the legal or contractual standpoint, the electronic original referring to the national legal provisions, and the printed paper copy in proximity to the recipient, comply with "measures" for archiving and local hardware contingencies, thereby justifying a specialized network for cross-border correspondence.

Only certain trusted functions may be delocalized on a network of secure corespondents without interfering with the delocalized operational modules. These are notably functions related to time-stamping and to the certification of the numerical identities referring to the national revocation lists.

Preferably, the symmetry of the archiving proofs and the switching of the messages by double-entry, that is to say by producing two documents on the basis of the original document, are applied and guarantee the authenticity of all the original documents.

For the combination of the dematerialization functions distributed over two agents hosted in the same Data Center, one of the agents is assigned to the trusted third party network, termed the "RTC". The principle of neutrality of the trusted third party implies that he has the trusted attributes of the people acting without himself doing their documentary operations with probative legal value which are entrusted to the second agent. This first RTC agent is above all a depository registration office for the trusted attributes intervening in the mail or in the dematerialized transactions. It is also this first agent which tracks the revocation lists for the certificates of numerical identity, as well as the time marks (time-stamping by atomic clocks).

On each dematerialization process, and in the sequence of the jobs carried out by the agent providing the services, he communicates the trusted attributes which come into the configuration of the operations: composition, preservation-archiving, communication and endorsement.

As a function of the anomalies raised in these circumstances by the service provider agent, the first agent can modify the rating of the numerical identity or revise the state of certain doubtful procedures in force (systemic regulation).

The second agent is assigned to the trusted jobs. He manages the end-to-end dematerialization process:
the composition of the structured files,
the archiving of the documents and proofs of exchanges,
the switching of messages or PDF images and
the production of copies by all means.

Between these four modules, which participate in the dematerialization of the documents and electronic transactions, there exists an audit trail with checks of trust and compliance, and appraisals of anomalies.

All these items are listed to maintain the traceability of each "original" between these modules and with the local correspondents invoked.

The dematerialization method thus described effectively guarantees that the three dimensions of the legal document based on a paper structured content (written or printed), of the organized exchanges procedures and the hand-written signature of the parties, are faithfully transposed into an electronic version with probative legal value.

The three electronic dimensions with probative legal value are thus brought together:
the people, by the electronic strong authentication,
the document, by the certification of the structured file and
the procedures, by traceability, signature and archiving.

For each user, the dematerialization takes place simply by virtue of a "correspondence-less office" placed at his disposal by the trusted third party network.

Each user is the owner, for dematerialization, of the documents dispatched or received from a correspondence current account for the switching of messages, and of an electronic safe for the legal archiving of the proofs of correspondence.

By entrusting to his trusted third party, through a secure communication network, his trusted attributes, each user can delegate empowerments regarding all the correspondence tasks relating to the composition of the documents, their transmission, their preservation and the endorsement.

The originality of this functional architecture also allows "mobile and collaborative management" of the dematerialized documents by itemizing with the internal procedures and the electronic signatures all the dematerialized-correspondence tasks.

The correspondence tasks are performed in complete security whatever the country and its regulatory constraints.

It is observed that there exists a real legal and functional interoperability in the dematerialization of the documents since the traceability may be checked end-to-end, and the legal archiving of the electronic proofs may be delocalized as a function of the authentication and preservation measures in force at the national level.

The dematerialization is organized on two independent structures:
a trusted system for the conventions of exchanges (measurement and transmission systems) and
a system for managing the documents (creation and services).

The trusted system is based on a technology for recording the numerical identities, personal attributes, revocation lists, and time marks.

The management system comprises four operational modules in which are embedded "the generic codes", that is to say the numerical identities and the trusted attributes of the parties to the transaction, be it a simple mail-file, or a structured contract-file.

The dematerialization is performed, on an operational level, by a provider of services distributed in four modules: composition of documents, preservation of originals, switching of messages, and endorsement of proofs.

The documents management utilizes each operational module by summarizing all the tasks performed with the corresponding trusted attributes on an audit trail.

This "traceability" makes it possible to systematically check by an exhaustive "list" the internal procedures, the external rules and the measures of legality and trust.

The "security and trust chain" thus exists by construction by virtue of the combination of the modules/tasks/trusted attributes summarized in each sequential "list", time-stamped, deposited in an electronic safe, and sequestered with a bailiff.

As regards the membership of a user invited by another user, who is a member registered with the trusted third party network R.T.C., the latter entrusts his "partners file" or "file of correspondents", that is to say his address book, to the trusted third party.

The trusted third party is mandated by the member to dispatch invitations to open a "correspondence current account" to all his counterparts in his address book.

This proposal addressed to the recipient, or invited guest, relates to the use of a "correspondence-less office", free of charge for "incoming mail". The invitations are dispatched:
either by secure electronic mail ("email") (if the address book so indicates),
or by postal mail via Posteasy: simple letter with a pamphlet,
or by SMS (if the address book indicates the mobile number),
or by a combination of the three.

If this proposal is agreeable to the recipient, he is invited to log in to the interface for registering and opening the correspondence current account: the URL is indicated for logging in.

Naturally, by accepting the invitation and "his" correspondence office, the recipient of a first registered letter with acknowledgment of receipt, wholly electronic, can instantaneously read his mail and download it.

The invitation is nominative. It contains an invitation number. It indicates the name of the inviting user. The proposal to open the "correspondence current account" comprises:
A. free-of-charge services:
1. A "correspondence-less office" for receiving secure mail or documents:
  with the instantaneous notification of "deliveries" via email or SMS,
  with the function of acknowledgment of receipt with probative legal value,
  with the PDF Image or XML Pivot download function and
  with the audit trail for each certified correspondence-mail.
2. An "archiving space" for the "incoming documents" preserved in the Data Center (free of charge for a maximum duration of 2 years on a rolling basis)
B. pay services: with a 50% tariff reduction for the first year
1. Dispatching of outgoing mail or documents
2. Legal archiving of outgoing mail or documents (3 years)
3. Sharing of the folders in "collaborative mode" in a "Data Center"
4. Management of secure "emails" recorded in the Data Center, then time-stamped and sequestered with a court bailiff.

If he is agreeable to the invitation, the guest registers in two stages.

In the course of a preregistration phase, the guest supplies his identity on the pre-enrolment form:
  name, forename,
  physical/postal address and
  telephonic address: fixed telephone, fax, electronic fax, mobile.

Thereafter, the form asks him to approve the general service conditions (also named by their acronym "GSC"): the "facilities-templates" for mail for which the correspondence third party ensures the secure transmission with probative legal value are described:
  simple letters or hybrid documents,
  hybrid registered letters or documents and
  dematerialized registered letters or documents.

He is then asked to choose a personal user name ("Login") to access his correspondence office and his correspondence current account. The guest is advised that he will soon receive a "password" through the means of communication of his choice:
  by mobile,
  by fax or
  by sealed post.

Next, in the course of a registration phase, when he is furnished with his "password", the owner can terminate the registration to his private office and to his correspondence current account. It is observed that there exist, on this office, free-of-charge management functions as options. For example, this office affords access to a rubric intended for the recording of the users by the owner of the correspondence account. Access to the log of the correspondence current account also makes it possible to track all the mail movements with their dispatch or receipt statuses. If the first session, of preregistration, has been interrupted, the guest must log back in with his user name and his password. He completes, if necessary, his civil status by giving the exact identity of the administrator of the correspondence current account (this is the owner).

The administrator specifies for the reception operations relating to each template facility (types of mail) the entitled people (the authorized representatives): name, forename, address, mobile, email, fax. The administrator specifies, for each designated person, the authorized operations, including for example, the sending of documents by registered letter with acknowledgment of receipt, the reading of documents, the downloading of documents and historical consultation.

The administrator allocates each authorized representative a user name and a personal password and undertakes to inform these people of these personal access data.

As a variant, the registration office can transmit separately the user name, with the entitlements, by secure postal mail, and moreover, a password, for example to the recipient's personal mobile, in the form of a minimessage.

The administrator optionally specifies, in respect of paying operations, the entitled people: name, forename, address, mobile, email, fax (same secure entitlement and information procedure).

The paying operations for the template facilities (for example, the types of mail) relate to the composition/validation of the documents, forwarding by any means, and faithful and enduring archiving.

The owner of the office and of the secure correspondence account also chooses one of the means of payment placed at his disposal.

The administrator ticks the "personal signature" tab so as to have a secret code issued:
  either by minimessage,
  or by fax,
  or by post.

It is observed that the secret code is a strong authentication for the acknowledgment of receipt performed by the recipient in relation to his correspondence third party who has his procuration to encipher, time-stamp and archive this official receipt legally.

To terminate the registration, the owner is prompted to consult the contract of membership of the trusted third party network, which network fixes the rules of exchange of mail or electronic documents with probative legal value.

To validate his contract of membership of the trusted third party network, he merely needs to activate his secret code on the interface in order to sign his membership form.

Registration is finished. A certified true copy of the membership contract mentioning the membership number and the correspondence current account number is dispatched by registered letter with acknowledgment of receipt to the declared postal address.

The trusted third party acting in the guise of registration office will confirm the numerical identity if:
  the acknowledgment of receipt is returned signed via the Post Office and
  the certified true paper copy (LRAR) is returned signed by the member with the requested supporting evidence of national identity or civil status, likewise signed by hand "certified true".

The trusted third party issues, as a function of the quality of the registration obtained, a membership certificate with a numerical identity rating (IN) from 1 to 3+.

The registration interface in its correspondence office specifies that if the member has obtained a rating for his numerical identity equal to or greater than 3, he can request, additionally, a "member electronic signature certificate" free of charge, or else a "qualified signature certificate", for which he must pay since it is issued by a public certifying authority.

As regards confirmation of registration, the inviting party is instantaneously informed of his registration. His address book is supplemented with the membership number of the guest. It is aware of the numerical identity rating of his counterpart. If the registration fees are charged to him, they are debited from his financial correspondence account.

The recipient of a wholly electronic registered letter, called LRAR, or of a tracked letter, receives a notification explaining to him that he can acknowledge receipt and read his document instantaneously by registering at once.

As soon as his registration is finished, he fills in the "acknowledgment of receipt" appearing on the interface of his office:
he ticks the document number to be opened and
he enters his secret code.

The document opens immediately and he can become aware of its content. The correspondence third party archives in an electronic safe the registered document with its enciphered and time-stamped acknowledgment of receipt.

If the recipient has not responded to the digital mail delivery notification LRAR, accompanied by a personal invitation, the document is automatically processed as hybrid mail with a paper legal trace posted as soon as the response period exceeds two to three days.

The agreement between the parties (forwarder/supplier and recipient/customer) makes provision to fulfill the following items:
1. The identity of the parties:
legal person: statuses, printout Kbis, designated administrator, authorized representative, entitled personnel, addresses (mail/billing), particulars (telephone, fax, mobiles)
qualification of the parties:
for mail (sender and recipient reciprocally),
for billing (supplier, customer) and
for the other contracts (specify).
other information:
procuration: designate the person and his function
2. The nature of the Exchanges:
mail templates: files (structured or not),
billing templates: file (structured or not) and
templates of contracts: files (structured or not).
3. The nature of the signature:
signature on sending:
mail,
bill and
other contracts.
signature on reception:
mail,
bill and
other contracts.
4. The choice of the providers of "trusted services": options of each party For dematerialization "par excellence", that which is recognized by the best rating issued by an independent audit and appraisal bureau (metric evaluation system), it is indispensable that the three systems for digital composition, electronic communication, and legal archiving are incorporated at the same trusted third party and in the same Data Center.

The operational and systemic risk is almost zero under these conditions since the least error is corrected by the platform whereas between several providers, the analysis of the error and the risk of litigation delays the solution by several hours or days between the parties.

As regards the designation of the trusted third parties, their mandates are chosen by the parties with their remote management "objects".

The dematerialization of the registered or tracked documents is generally operated by a neutral trusted third party (in compliance with the regulations in force) so as to establish:
the probative value of the document,
the acknowledgment of receipt and
the legal archiving of the proofs.

In this job, the trusted third party intervenes in the correspondence between the parties involved in three phases:
1. The composition and/or validation of the document
authentication of the sender and integrity check,
verification of the document or of the structured file,
composition of the registered original and
validation and personal signature.
2. The transmission and reception of the message
certification of signed messages,
switching of messages (bilaterality),
electronic communications (notification, downloading) and
time-stamping of the recorded messages.
3. The preservation and restitution of the proofs
legality and compliance check,
legal deposition in an electronic safe,
tracking of activity and evidence of proofs and
Court Bailiff sequestration and restitution.

The sender transmits to the trusted third party either a "signed document" or a "structured file" of data. In both cases, the trusted third party verifies compliance and point out any anomalies.

The original of the document is given a registration mark or a bar code before being signed for transmission to the recipient.

The recipient is notified, by minimessage, fax, electronic fax, or e-Mail, to consult the document on his secure-correspondence "current account".

The dematerialized registered document is preserved in legal deposition in two electronic safes ("E.S.") to ensure faithful and enduring archiving.

The registered document is thereafter transmitted by message switching to the two secure-correspondence current accounts.

The "registered document", received by the recipient, is dependent, for its reading, on the prior signing of an "acknowledgment of receipt" slip. This dematerialized slip confirms receipt with the references of the deposited envelope (registration mark, enrolment number in correspondence current account and legal deposition number in electronic safe).

On the other hand, the "tracked document" only forms the subject of a notification and of a delivery to the correspondence current account and its reading requires an authentication with the "personal signature" of the recipient having the necessary entitlement.

For the transmission of the documents, the forwarder and the recipient must be members of the secure correspondence network S.C.N.

If the recipient is not enrolled, he receives an invitation informing him of the delivery of a registered document, and specifying that the "reception services" are free of charge.

The electronic signatures whose rating is level 3 are generally intended for the forwarding and acknowledgment of receipt (concept of electronic initialer).

In particular embodiments, a member electronic signature (MES) with a private certificate reserved for the exchanges in the secure correspondence network (Partner file) is implemented.

The existence of a qualified electronic signature (MES) which is intended for all the exchanges in the public domain and in the network of member users is also proposed or recognized.

A member can either use a pre-existing signature employed for other personal applications (tax statements for example), or be allotted a qualified signature sent by a certifying authority to which the device which is the subject of the present invention has transmitted the enrolment folder if the rating is 3+.

The RTC ensures the legal archiving and the restitution of the dematerialized documents over the durations chosen by the members (1 to 10 years).

The difference between the registered document and the tracked document exists at the notification and acknowledgment of receipt level:

- for "registered", the notification comprises the number of the legal deposition in an electronic safe and the enrolment number in the correspondence current account. The authenticated recipient and, appearing on the partners file of his correspondents, must fill in the dematerialized form of the "acknowledgment of receipt" by indicating the number of the legal deposition written on the notification, and by using, as he chooses, his personal signature (PES), member signature (MES) or qualified signature (QES). The registered document may not be read without having filled in the "acknowledgment of receipt" dematerialized slip.
- the notification of the "tracked document" possesses only an enrolment number.

The dematerialization procedures for the correspondence documents with probative value, tracked letter (TL) or registered letter (RL) are described hereinafter.

The "organized correspondence" relies on two principles: the compliance and the legality of the electronic mail, on the one hand, and the prior membership of an agreement or a secure correspondence network (S.C.N.). It is possible to refer to the membership contract template. As set forth above, the terms of enrolment with the secure correspondence network envisage either spontaneous candidature, or the invitation procedure.

As regards the compliance and legality of the electronic mail with probative value, these concepts apply to the structured or unstructured file on the basis of which the electronic mail document prepared by the forwarder, or sender, is composed.

Mail correspondence relates to tracked letters (TL) or registered letters (RL). These letters may be prepared either on the user's workstation, or directly on the platform of the correspondence trusted third party, that is to say prepared in a Data Center on templates placed at the disposal of the users.

These letters are created either as "free text", what is customarily referred to as "unstructured file", or conversely, these letters are created as a "structured file". The benefit of the structured file is that it complies with a form containing the necessary data which are situated with tags in particular fields; some of these data are compulsory items such as the corporate name or the address of the recipient, and all these fields form the subject of consistency checks. The other benefit of the structured file is that the creation, publication, transmission, and archiving of the document are dependent on compliance or legality checks which are entrusted to the trusted third party for the benefit of the two parties involved in the correspondence.

All these constraints are naturally cataloged in the exchanges agreement signed by the two parties before beginning their "organized correspondence".

The "structured file" may be created and validated on the forwarder's workstation before the document forwarding entrusted to the correspondence trusted third party.

Under the other assumption, the data are prepared on the workstation and communicated to the trusted third party who merges them in the document template deposited with him. In this case, the forwarder forewarned of the composition performed by the trusted third party, can remotely validate the original of the document before its forwarding to the address of the recipient by the chosen means of transmission. In this specific case, the trusted third party who is the depository of the form and who receives the data so as to compose the original document, verifies that the compulsory items are indeed filled in before proposing the forwarding of the document to the signing of the sender.

The correspondence agreement signed by each of the parties, independently of one another, makes them members of the secure correspondence network S.C.N. They are in this respect full members of the SCN network. At this juncture, the provision of services contract between the forwarder and his trusted third party, specifically indicates whether each member uses, for the outgoing mail (dispatching of dematerialized documents), structured forms with compulsory items, and whether the service provider is responsible for the composition of the original documents, or only responsible for checking their legality or their compliance.

Generally, the letter is a piece of mail based on an unstructured file. But most large enterprises are currently organized as a function of business rules, regulatory constraints, and new provisions of the laws on financial security, so as to exchange forms incorporating structured files and checks with their partners or their regular counterparts.

The composition and/or verification of these forms are entrusted to a correspondence trusted third party who thus guarantees the legality and or the compliance of the documents for the two parties.

For structured files, either the composition is done by the sender and, in this case, the correspondence trusted third party limits his provision to verifying the existence of the compulsory items, or the trusted third party intervenes as provider for composing the document and, in this case, he does the merging of the data received from the sender in the electronic form of which he is the depository; the result of the composition thereof is firstly verified by the trusted third party and thereafter validated by the sender so as to forward the document by any means and archive the proofs of this correspondence.

The concept of security check relates to the remote identification of the parties and to the integrity of the communicated data.

In addition to the examinations (compulsory items, partners file, final addresses or destinations of the document) to be done on the very nature of the computerized file on the basis of which the original document is established, the trusted third party must "remotely check" the identity of the sender by authenticating his electronic signature. He must also verify the integrity of his message. Finally he must authenticate the recipient and verify whether he has indeed signed a prior agreement for secure electronic correspondence with his counterpart via the SCN network (membership of the secure correspondence network).

The delivery of the dematerialized mail to the recipient assumes in fact that the two parties have already defined and agreed in advance terms of "reception" of the electronic documents: the electronic "mailbox" hosted and retained by a trusted third party in his "Data Center" is the best solution and security. Without a "mailbox" hosted and secured by a trusted third party, the reception proof may not be established easily or instantaneously. And correspondence anomalies, if any, may not be discerned, notified, and corrected effectively.

The dematerialization of the documents relies by definition on reducing the risks of litigation and recourse to the courts; the actual disputing of the validity of a document and of a dematerialized correspondence ruins the trusted chain and its provider.

The dematerialization is organized preventively by ensuring that the whole of the management and signature process "contains" no security gap. In the case of malfunction, a system is also provided for detecting anomalies, and for each of them, an instantaneous correction device is provided which is implemented in the same "Data Center". Stated otherwise the correction device is not bound to any external authority so as to avoid delays and deadlines that are incompatible with the security which must protect the stringing together of electronic transactions.

The check of security and legality therefore impinges not only on the content of the message with its compulsory items, but also the container. The check also pertains to the electronic correspondence envelope on the basis of which the trusted third party will authenticate the identity of the sender, who dispatches, and of the recipient, who receives or acknowledges receipt.

The secure electronic address for receiving mail or for acknowledging receipt must indeed be an official address, that is to say an address verified and recorded by a neutral trusted third party. Each address is recorded in the membership contract for the sender and declared for the recipient in the partners file which initiates by invitations the enrolment of the declared counterparts.

The partners file is preserved by the neutral trusted third party such as specified by the regulations in force.

Without this legality check impinging on the identity of the people, their correspondence address, their signature and the structured content of their messages (mail document and notice of receipt document or reply coupon), the probative value of each electronic document may not be dependably established and archiving with no legality check exposes the parties to disputes on the day of its restitution.

Prior membership of the secure correspondence network S.C.N. presupposes the setting up of a correspondence agreement with probative value. Indeed, correspondence of hybrid letters or mail (paper and PDF image), and of totally "dematerialized" documents relies on the principle of a "correspondence agreement".

The agreement of organized exchanges is based on the need to obtain, at first sight, the membership of the counterparts or of the regular or professional correspondents thereof. This adherence to the rules of exchanges and of secure correspondence often refers to a community standard (EDI, XML, etc.) and to the practices established by the correspondence trusted third party.

It is thus established that the mail correspondence with probative value is based on the need to include each counterpart or recipient in his "partners file" and to obtain his consent on the established rules of exchanges. These provisions have priority before beginning any movement of correspondence.

Any legal or physical person who addresses a piece of mail to a new counterpart, that is to say to a person who has not yet subscribed to the membership contract (secure correspondence network), generally resorts to the trusted services of his correspondence third party to submit or propose this membership contract to the "new recipient".

In this way, the two parties accept identical or symmetric rules of exchanges at the same trusted third party.

The two parties benefit from the same rights and advantages for administering the proofs of electronic correspondence: each proof noted by the correspondence trusted third party is established and preserved in a symmetric and bilateral manner. And the proof thus recorded is time-stamped and sequestered with a court bailiff so as to be opposable to the third parties.

The legality check on the correspondence file and the membership contract between the parties involved in electronic mail are fundamental elements for establishing the probative value of a "dematerialized" document, that is to say without recourse to "hardware proofs".

To facilitate the checks of legality and of mutual membership, recourse to the correspondence trusted third party is practical since he is organized to take these expedients and perform these checks in the interest of the two parties.

In relation to insurance companies, this template for security and for reducing operational risks is of such a nature as to limit risk premiums.

Insofar as people's rights, their signatures and the structures of files can change at any moment, recourse to the trusted third party is practical since he undertakes to "control" these changes.

The specifications of procedures for electronic documents with probative value (tracked or registered letters) deal successively with each of the constraints of the dematerialization in the order of the factors implemented to guarantee legality and security over the whole of the "correspondence chain":

preparation-composition: identification and structured file,
transmission-reception: certification and identification and
archiving-restitution: validation and preservation.

The membership contract for adhering to the "dematerialized correspondence" agreement comprises:
the personal enrolment,
the identification,
the personal attributes,
the composition of the documents,
the correspondence templates,
the electronic signature,
the partners file,
the secure service provisions (trusted third party, correspondence third party, archiving third party) and
the invitation of the partners.

As regards the dematerialized correspondence procedure, it comprises:
the initial sending,
the original: creation of the document,
the legal deposition, the archiving: electronic safe (ES),
the message switching: two correspondence current accounts (CCA),
the notification to the recipient,
the acknowledgment of receipt (AR),
the original of the AR,
the archiving of the AR,
the delivery of the AR to the CCA,
the information to the forwarder,
the consultation, downloading,
the failure procedure: hybrid document alternative,
the types of mail: registered or tracked document and
the pairing: electronic registered folder.

Each legal or physical person enrolls in the secure correspondence network S.C.N., with his civil status, his telephonic particulars and his Internet address.

The trusted third party holds the directory of its members who are thus in a closed and secure community.

As regards the remote identification, the enrolment and the recording of the personal identities optionally incorporate those of the users or employees to whom certain correspondence functions are entrusted.

The entitlements are nominative for preparing the data, validating the document, transmitting, receiving, reading or consulting, and downloading.

The personal attributes are the discriminating features generally used to establish civil status and to refer to the person enrolled: identification of the legal person ("Kbis"), identity card, banking, tax or social identifier are the supporting evidence most often used.

But, for an enrolled enterprise, it is also the individual and social function that should be specified: manager, social agent, administrator, delegated director. The representative of the company that enrolls in the secure correspondence network SCN in order to use a correspondence current account is referred to as the "administrator of the application" and, in this respect, he can give entitlements for the correspondence functions. All these features, deposited with the trusted third party in order to identify people and thereafter authenticate them remotely, are dubbed "trusted attributes".

The trusted attributes are deposited with the trusted third party to allow it to identify the person remotely on the basis of his certificate or his secret code. These two identification "objects" indeed bear certain attributes to establish the link between the people and their rights in the correspondence and correspondence current account management application.

Certain personal correspondence objects, such as the forms with their particular management procedures, are also associated with the attributes.

As regards the composition of the documents, if it is data which are received by the trusted third party, this implies that the member has previously decided with his provider to entrust him with the composition of the document on the basis of a structured file whose template has already been deposited with him.

In any event, the trusted third party performs the legality and compliance check by verifying the identity of the sender, the integrity of the data received, the existence of the recipient in his partners file (existing member with particulars with no anomalies) and he verifies that all the compulsory items exist in the document.

The composition of the document consists in merging the data in the corresponding "deposited template", incorporating thereinto, optionally, a bar code and the "rating" of each partner having a correspondence current account.

The "rating" is a security index which indicates the value or the quality of the enrolment of each person or owner of a correspondence current account. The rating of the identity of each of the parties makes it possible to forewarn each party of the risks, if any, existing regarding the identity of the counterpart, notably if the enrolment procedure is in progress or if the rejection of simple or registered postal mail calls into question the correctness of the residence or of the administrative domiciliation.

Insofar as the trusted third party deals with hybrid and dematerialized correspondence, he may detect a certain number of anomalies which cause the rating of the personal identity to vary, this being called the "dynamic identity" (DID).

As regards the correspondence templates, each member can deposit his document templates. These are generally contractual documents complying with a formalism with business rules, compulsory or complementary items, and consistency checks.

For each form, the member has the option of designating the people in charge of transferring the data, of validating the composition of the document, and of ordering its transmission with a signature.

The trusted third party can also receive documents which are "ready for forwarding", and in this case his role will be limited to verifying the existence of the identities/registration marks/correspondence accounts of the parties involved before performing the forwarding.

In certain cases, if the original documents communicated by the forwarder are intended to be archived enduringly with the "archiver" trusted third party, this provider undertakes to redo the legality check and the tests of compliance on the base defined in the dematerialized correspondence agreement. In this way, the archiving of null and void documents is avoided.

In other cases, the trusted third party acts as a separate document composition provider, and generally, he intervenes on a template referring to a structured file for which he is in charge of filling in all the compulsory items on the basis of the data communicated by the sender.

The tracked or registered letters are generally documents making no reference to a structured file. Legal and contractual constraints are today leading dispatchers increasingly often to entrust the job of structuring their mail or their dematerialized documents to their trusted third party so as to avoid any legal dispute or litigation subsequently.

Anyway, enterprises which do not comply with the "dematerialization" standards will not be able to avail themselves of any compliance in regard to the laws relating to financial security which require them to demonstrate that the operational risks in the administrative sector are well controlled.

For want of certification in this sector, enterprises therefore approach certified trusted third party providers. (TAJ, etc.).

As regards electronic signature, each member has the choice between three signatures for remotely authenticating himself and for enduringly ensuring the integrity of the document.

In so far as the trusted third party creates the document in his "Data Center" on the basis of the data transmitted in complete security, the integrity of the document created in the "Data Center" is not called into question. Indeed, the transmission movement being done in the Data Center between two correspondence current accounts, no "delivery risk" exists.

Moreover, as the "traceability" of the exchanges is organized on a bilateral base (double-entry management, that is to say with copy of the original document in the current account of the recipient), any internal error or malfunction will immediately be detected and will be regularized retroactively without difficulty. On the other hand the "integrity of the original document" must be ensured enduringly by the preservation by legal archiving referring to the standard, for example the AFNOR standards.

For the document created, transmitted and archived in the same "Data Center", the authentication of the sender on the basis of his signature is therefore an essential element. In this respect, some embodiments implement a double authentication device for the signature of a document.

The sender is authenticated a first time by his password to access his correspondence current account (CCA) or to access whatever is taking the place of correspondence office on his behalf: on this interface he can validate, sign and order the forwarding of his document. At this signature level, he can activate a second secret code to authenticate himself and authorize his trusted third party to encipher the electronic document with his signature certificate which is qualified or secure. Authentication is thus strengthened.

Authentication with integrity checking by way of a mobile telephone and remote signing in a white room (signature of the trusted third party) help to strengthen the authentication and the integrity in a context of complete mobility.

The signatures are, hereinbelow, enumerated in the order of their probative force:

For the personal electronic signature "PES", the member has a personal authentication code ("pin" code) and a secret code reserved exclusively for the exercise of the qualified signature which is used by the trusted third party to sign by procuration and therefore to encipher the documents to be forwarded. In this way, the integrity of the original document is ensured during legal archiving. The member agreement provides for this trusted service and specifies that all these signature operations are registered, time-stamped and confirmed to the member. All the signature operations are also logged in a journal of signatures which is sequestered each day with a court bailiff. Each dematerialized-document transmission "session" forms the subject of a "traceability" report which is incorporated into the correspondence current account and "paired" with the document itself. The "traceability" report of each original document contains all the registration and time-stamping information relating to the authentication acts and the encipherment acts, while each time specifying the nature of the electronic signature used.

For the member electronic signature "MES", the secure correspondence network, distributes to the members who request it in their enrolment form, a certificate devoid of electronic signature reserved exclusively for the movements of correspondence and of archiving in the trusted third party network, as well as for the intermediate operations managed by the partner-members. Each electronic certificate bears the personal attributes of the member or of the people delegated (authorized representatives). These attributes have therefore been previously recorded and validated by the trusted third party, on the basis of the civil status declaration and of the receipt of the supporting items certified as true to the original by the owner of the correspondence current account. All the operations done with this "member certificate" are recorded and sequestered with the court bailiff. The revocation or "suspension" list for a certificate is held on an isolated server in the same "Data Center", but the utilization thereof has been entrusted to an independent third party in such a way that in certain situations the trusted third party is not judge and judged. The certificate may be downloaded remotely so as to be installed by the user on his workstation or on a USE key. As the membership procedure takes several days, while the items of the folder are being assembled, the member certificate may not be issued on the day of enrolment, but only after the date of issue of the evidence of membership. For this reason, if the enrolled person does not already possess a qualified public certificate such as explained in the following paragraph, the person can only sign his electronic enrolment with the first signature dubbed "personal electronic signature" PES.

For the qualified electronic signature "QES", the member can purchase and use a qualified electronic signature certificate which is distributed "face to face" by a certifying authority which issues certificates and which personalizes them as a function of the personal attributes which were delivered to him by the person himself or by the delegated trusted third party which is a "registration office". In this case, the member will have to indicate in his membership form the existence of this certificate so as to forewarn the trusted third party of the expedients which require him for each signature effected to systematically consult the revocation list (canceled or suspended certificate) published by the certifying authority.

The correspondence third party is that which ensures the electronic communications, doing so by "switching messages" between the two secure correspondence current accounts, with routing options (delivery by post, email or secure electronic fax). For each transmission, the certification of the exchanges and the notification of the document to the recipient are services rendered by the correspondence third party (verification of the validity of the signature certificates from which these exchanges originate).

The archiving third party firstly checks the legality of the document which is transmitted and only thereafter, the faithful and enduring archiving is performed with the correspondence proofs. The archiving third party enciphers the document with his qualified signature so as to preserve the integrity of the original document, doing so in order to deposit it in the member's electronic safe together with a serial number and a time-stamp. He can then return each document at the request of its owner.

The invitation of a partner can also be made spontaneously at the time of the transmission of a document to a person not yet identified and enrolled. It appears in the directory of the "partners file" at the sender but hitherto no invitation procedure has succeeded. In this case, the invitation/membership procedure is launched simultaneously, and the recipient may only be made aware of his document when the enrolment formalities have finished. A few days may therefore pass without it being possible for the document to be opened in the correspondence current account reserved for the use of the recipient. If no membership has been registered within a period of eight days, the electronic document is re-materialized by the trusted third party, placed in an envelope, and posted. But the recipient, for whom the trace of the electronic document is kept in his temporary correspondence account, does not have access to this account as long as the membership has not been regularized.

If the recipient refuses the membership invitation or does not manage to fill in his folder within the deadlines allowed (two to eight calendar days), the electronic document is re-materialized, that is to say printed by the printer third party and posted. The paper document is accompanied by an explanatory leaflet regarding the operation of the secure correspondence network and the advantages of the correspondence current account reserved for his temporary use.

If his membership is regularized within a period of thirty days, he retains the advantage of preserving the first electronic document dispatched in his correspondence current account. Beyond a month, if the enrolment formalities have not finished, the procedure is considered to have failed and the temporary correspondence current account is closed.

The reception services, in tracked or wholly electronic registered letter mode, comprise the management of the "acknowledgments of receipt", the reading of the documents received, downloading, and short-term preservation, for example one year.

The forwarding services comprise numerous options which relate to composition, transmission, and legal archiving. The owner of the correspondence current account indicates whether or not the trusted third party is chosen as provider of structured documents. In the first case, he therefore entrusts him with his forms with the rules for managing his structured files (wording, tags, validation procedures and signature). In the converse case, if the documents are already prepared, the trusted third party is only responsible for transmission and for faithful and enduring preservation. Optionally, the forwarder can ask the trusted third party to carry out a legality and compliance check before forwarding and archiving.

The personal electronic signature is a simplified signature with a specific secret code. The signature proceeds from an authentication based on the combination of the "login", the password and the "secret code" reserved for the encipherment of the signed document. The encipherment of the message is entrusted to the trusted third party which uses its own "qualified certificate" to perform this operation.

The owner of the correspondence account therefore consents to give a procuration to the trusted third party solely to encipher his documents so that their integrity is ensured in the Data Center, and for the duration of archiving and restitution requested. The confidential code implemented for "remote signing" is a six-digit number. He can ascertain this in various ways:
- his GSM mobile telephone number (by SMS minimessage),
- his professional fax machine number and
- his postal address.

The secret code transmitted to activate the "personal signature" which is not "signaled" in reception within a limited period, becomes inoperative.
This period depends on the communication channel used. For example, this period is:
- for the mobile telephone network: 5 minutes,
- for fax: 10 minutes and
- for mail: 3 days.

It is necessary, in the case of failure, to resume the procedure at the level of choosing the electronic signature. Beyond the limit period, if the beneficiary of the secret code has not signaled proper receipt through the chosen channel, the interface indicates to him that he must resume the procedure at the level of choosing the communication medium used to recommence my transmission of the secret code.

A person who forgets his personal signature secret code can request the creation of a new secret code for his personal signature by recalling the characters of his preregistration from the folder (example: 2005.12.18.21.32.Milou).

The second electronic signature is the "private certificate" distributed by the trusted third party: member electronic signature (MES). This certificate is given only when the enrolment formalities have finished, that is to say when the trusted third party has received the paper evidence in support of the on-line registration. This supporting evidence must all be certified true by the hand of the member. His signature will be verified is by comparison with the "acknowledgment of receipt" that the post has returned to him. In fact, the "member electronic signature" MES may be given to the owner of the correspondence current account as soon as he has received his SCN membership statement by email.

The third electronic signature may be chosen with a certificate distributed by a public certifying authority (CA). This is the qualified electronic signature (QES). Either the person already has it on his workstation, or he requests the trusted third party to get one for him. This request cannot succeed as long as the membership contract and the return of the supporting evidence are not formally validated by the dispatching of a confirmation of the membership form. In the latter case, the folder for recording his civil status "instructed" by the trusted third party, will be delivered by him to the certifying authority so that they personalize the signature certificate registered in his name.

If the person is already using a qualified certificate on his workstation, he will indicate the name of the certifying authority in such a way that the correspondence trusted third party can systematically look him up to verify on his "revocation list" whether the certificate is still valid and active.

The membership contract may be signed by the first signature called a "personal electronic signature" (PES). The membership contract cannot yet be signed with the member electronic signature (MES) since the latter is available only after having obtained the "membership statement". Now, this statement is dispatched only if all the items of the folder are brought together and validated by the trusted third party, this taking a certain mailing period. No member electronic signature (MES) or qualified electronic signature may be requested without having a personal identity and membership rating below the qualification "certified" (Level 3). Under certain conditions, the membership contract may be signed by the third signature having a "qualified certificate", that is to say that which is provided by a certifying authority (CA): this is solely when this signature certificate is already installed on the user's workstation at the time of enrolment.

When the membership contract is ultimately signed, it is recorded in the correspondence current account of the new member, it is even the first "incoming mail" exchange that he can open or consult.

At this juncture, the membership contract is recorded with the wording or the rating: enrolled member (ENM). This is the second remote identification level (level 2 rating).

The first identification level recognized by the trusted third party is that which corresponds to preregistration: only the restricted or limited civil status has been filled in either by the information communicated by the inviting person (confirmed member), or filled in by the new member in the preparatory phase.

The preparatory phase is that specifying the civil status with the approval of the membership contract but without mention and choice of an electronic signature. This level is dubbed "declared member" (or "DME"): level 1 which only allows the removal of tracked letters or documents. There is no explicit acknowledgment of receipt with an electronic signature but the member has accepted the membership contract.

He can subsequently track the membership procedure in order to note down his level or his identification rating. The membership statement is formalized and signed by the trusted third party only if the following last formalities are fully complied with: the member is invited to dispatch the paper evidence in support of his "civil status": photocopies of KBIS, identity card, Passport, Bank Account Details (BAD or "RIB" in French) or crossed cheque. On the photocopy of his civil status, he is requested to affix his hand-written signature by writing "certified as per the original", while also putting the date.

As soon as the supporting documents are received by post, the trusted third party verifies that they comply with the declarations stated in the electronic membership contract. The trusted third party thereafter verifies that the signature affixed to the "acknowledgment of receipt" coupon of the registered letter dispatched by the trusted third party is completely identical to that certifying the compliance of the photocopies of his civil status.

If this verification is positive, the trusted third party constructs the member's electronic folder by pairing the paper documents (in support of his civil status) which will be scanned, together with the existing electronic originals, namely the signed membership contract and the hybrid registered letter together with its AR (scanned).

The electronic folder is archived in a safe and all the correspondence proofs are sequestered likewise with a court bailiff. At this juncture, the trusted third party issues a membership statement worded as follows:

for a complete folder with no defect, "certified member" CEM Level 3 and for an incomplete folder, "enrolled member" ENM Level 2.

Over a certain number of criteria that are specific to the trusted third party, it is possible to attain a maximum rating of Level 4. This rating is officially recognized for the member who has physically gone to the trusted third party Posteasy enrolment office: this is the "face-to-face enrolment".

The qualification for level 4 is: "certified member plus" or "CEM+". The rating of the members appears systematically in each correspondence document to inform each counterpart (transparency). There exists, for this purpose, a security area in each item of correspondence which specifies the references of the two signatures used (PES, MES, QES) as well as the current rating of the two member parties.

The rating of the identity is one of the aspects of the present invention. As a function of the quality of the registration folder filled in, a rating is allocated to the identity of the owner of the correspondence current account. This rating makes it possible to easily spot any anomalies which limit the certification of the trusted third party or which leads him to certify with reservations.

The downloading of the member signature: as soon as the registration contract is validated and confirmed, the trusted third party invites the member to download the signature certificate (MES or QES) that he has requested and which has been reserved for him. Technically, this involves a simple java (trademark) applet compatible with most computer configurations on the market.

If certain information relating to the partner's situation has changed, the trusted third party keeps the inviting user informed and his partner file is automatically updated.

In principle, the dematerialization relies on the services of a trusted third party who is a provider of documents, an operator of secure electronic communications, and an archiver of the correspondence proofs. Its services pertain:

to the strong authentication of the parties involved in the correspondence,
to the encipherment or the encrypted printing of the document (Sha1 or.sig),
to the structured file with its compulsory items,
to the secure-message switching and
to the legal archiving of the proofs (1 to 4).

The sender dispatches his data stream by FTPS (secure communication protocol). In the guise of a member, he is known to the trusted third party. He has, notably, optionally deposited forms or structured files. He is authenticated by his login and his password. If it is a server which sends the data stream, there is often a level 4 "server certificate".

The validation of the dispatch, by the forwarder, for transmission requires a signature (secret code or certificate). The personal electronic signature PES suffices for this kind of operation. The authentication of the sender is manifest and the encipherment may be effected on the platform in a "data center" with the qualified certificate of the trusted third party.

The trusted third party then constructs a compressed file ("ZIP") comprising the document, the signature and the certification. If the sender has no digital certificate, it is the trusted third party that enciphers by procuration. The signature of the trusted third party on the basis of strong authentication affords the validated document an encipherment with the qualified certificate of the trusted third party. The compressed file is deposited in the electronic safe of the two parties. The legal deposition of the original of the document is time-stamped and given an archiving legal deposition number ("LD" number).

The message switching implements the symmetric correspondence current accounts "CCA" of the two parties. The faithful copy or the duplicate of the original document is delivered to the correspondence current account. The dispatch database is advised: dispatch number and legal deposition number with the time-stamping.

The format dispatch, for example in the "PDF" (trademark) format, is placed in the sender's CCA and he is immediately informed thereof by notification (email, electronic fax or mobile telephone). The notification is a notarized message and is therefore recorded in the form of an email, electronic fax or SMS. The forwarder can thus note that the dispatch has indeed been sent.

The recipient is advised, for example by email, of the "delivery" of a dispatch together with its legal deposition number: in no case can he read it without having given his acknowledgment of receipt. It is specified to him that the forwarded document is a "dematerialized tracked" dispatch/document (DTD) or a "dematerialized registered" dispatch/document (DRD). The acknowledgment of receipt is a separate document. This document is either a "reply coupon" drawn up in the name of the recipient, or a more formalized document which has recourse to the electronic signature to strengthen the "non-repudiation".

With the deposition number, the entitled person (recipient) logs in to the interface. With his user name ("login") and his password, the recipient accesses his correspondence current account (C.C.A.). To remove the registered document, he is asked for the legal deposition number (LD). The recipient uses his personal electronic signature to sign the "acknowledgment of receipt" AR.

His personal electronic signature comprises a secret code to strengthen his remote authentication and to activate the encipherment of the "AR" on the basis of the qualified certificate of his trusted third party (procuration). If the recipient has downloaded a member digital certificate or qualified digital certificate (distributed by a certifying authority), he can sign his AR directly and globally by enciphering the message himself. Ultimately, the electronic signature enciphers the "acknowledgment of receipt" document.

For a recipient who has just registered and who has little mastery of computing, the simplified electronic signature SE procedure is recommended: in personal signature PES mode, the recipient uses his secret activation code. Activation allows his strong authentication and entrusts the encipherment of the AR (with time-stamping) to the trusted third party. This simplified procedure is compared to the other two:

in member signature mode, he gives his "private certificate" and enciphers the AR by himself,
in qualified signature mode, he gives his "public certificate" and enciphers the AR by himself.

In all the signature solutions, the validity of the certificate employed is verified. So as not to be judge and judged, the servers of signatures are entrusted to an independent third party. The trusted third party verifies that the legal deposition number of the forwarded document appearing in the AR is correct. The trusted third party thereafter verifies for the signature (.Sig) that the certificate used by the recipient to acknowledge receipt is indeed valid. If these two checks are positive, the trusted third party composes the original document of the AR. He indicates in the journal of signatures for this original the nature of the certificate used together with a time-stamp. Each signatory, by activating his electronic signature, receives a confirmation email with the references of the journal of signatures.

The signature journal comprises: dispatch/document number, legal deposition/document number, legal deposition/AR number, the two member numbers, the two signature references with their time-stamp. The original of the "acknowledgment of receipt" AR is archived in the electronic safe.

Following the archiving of the AR coupon or slip, the duplicate or the true copy complying for example with the "PDF" format is delivered to the CCA. The two parties are notified by email/SMS of the acknowledgment of receipt coupon in the CCA. The entitled people can thereafter consult and download the AR. The recipient can thereafter read and download the original of the "registered document". In each correspondence current account, the registered document and the acknowledgment of receipt are stored alongside one another (pairing, electronic folder management).

The traceability of the operations is transmitted and sequestered by a court bailiff in two phases:
  document composition, archiving, correspondence current accounts and
  composition of the acknowledgment of receipt, archiving, correspondence current accounts.

If anomalies are spotted by the trusted third party at the time of input of the "Acknowledgement of Receipt", these are notified to the recipient of the registered document (list of anomalies, time-stamping, bailiff sequestration with time-stamping).

If the recipient of the registered document has not filled in his "acknowledgment of receipt" coupon within a period of two to eight days, the trusted third party materializes it, by way of the printer third party, as a paper document under cover of an envelope and has this envelope posted to the recipient's physical address.

The hybrid mode registered document consists in delivering the mail in paper format via the post to the recipient. The recipient becomes aware of the document after having signed the acknowledgment of receipt paper slip (AR).

He can thereafter consult the true or faithful copy in his correspondence account as soon as he indicates on the interface the number of the slip of the acknowledgment of receipt that he has received. Otherwise, in chronological order, he can consult all his incoming dispatches together with the paper ARs which have been recovered by the trusted third party and scanned.

Pairing makes it possible to construct a registered folder by matching between the paper and digital documents. As soon as the trusted third party has recovered the acknowledgment of receipt slip signed on the paper by the recipient, the latter being delivered to him by post, he can scan it and match it against the electronic document sent.

The trusted third party also scans the AR paper document so as to store in the two correspondence current accounts the recipient's hand-written signature and the bar code which is associated with the registered letter.

By inputting the AR slip number, the forwarder and the recipient can open the files, for example in the "PDF" format, of the registered folder (the document and the AR, both time-stamped by the post).

The difference between the "registered" and "tracked" dematerialized document lies at the acknowledgment of receipt level. For the registered document, the trusted third party has the recipient "compose" an "acknowledgment of receipt" which is a separate piece of mail.

The dematerialization of the reply coupon therefore complies with the formalism of the dematerialization. There exists a structured format to be filled in on line by putting the legal deposition number and by using one of the three electronic signatures. This document is archived legally in an electronic safe together with a time-stamp and its own deposition number. And no reading of the registered document may be done by the recipient as long as he has not signed the acknowledgment of receipt.

For the tracked letter, simple authentication of the recipient at the time he logs in to his account suffices to enable him to become aware of the mail. There is no document to be filled in for complying with the legal formalism of the acknowledgment of receipt specific to the "registered" correspondence.

There is solely a reply coupon which is optional. The proof of acknowledgment of receipt is administered by producing only the information regarding the time-stamping when the recipient accesses his correspondence current account, as well as the time-stamping logging the opening of the file for example in the "PDF" format containing the "incoming" document.

All the steps of the membership procedure are time-stamped:
  either at the level of the connections/communications with the trusted third party,
  or at the levels of "composition", "switching" and "archiving".

Each document possesses a dispatch number, a legal deposition number and an acknowledgment of receipt number. Each signature is journalized on an appropriate audit trail.

The electronic communications may be processed by mobile telephony, by electronic fax, by post (hybrid mail), or by telephone (server or call center).

All the operations appearing in the scheme for dematerialized processing of a membership, or else of a dematerialized correspondence (LRAR or TL), are recorded and time-stamped so as to supply the general audit trail (GAT) sequestered daily with a court bailiff.

The movements of message recording on the correspondence current accounts are performed bilaterally with a serial number. The movements of archiving in the electronic safes are performed bilaterally with a legal deposition number. Each time-stamping is carried out systematically by cross-checking two atomic clocks, including a Meudon clock.

For the time-stamping, the NTP protocol (the acronym standing for "Net Time Protocol") is used to synchronize with the Meudon atomic clock. In the internal network, the clocks of the servers are themselves in synchronization with the clocks of the two gateways.

In the contract of membership of the secure correspondence network each party is forewarned and accepts that the service is interrupted from thirty seconds to midnight until thirty seconds past midnight to neutralize any edge effect between two dates, the synchronization tolerance being considered equal to thirty seconds here.

More details regarding a particular implementation for rating a communication of a document are given hereinafter. This rating employs three complementary scores:
  a validation score for the document,
  a validation score for the correspondence and
  a validation score for the archiving.

As regards the validation score the correspondence, it employs, for example, the scores hereinbelow:
  1 for simple postal mail,
  2 for secure simple postal mail with probative value,
  3 for registered postal mail with acknowledgment of receipt,
  4 for registered postal mail with secure acknowledgment of receipt with probative value,
  5 for a secure electronic mail without probative value,
  6 for secure email with probative value,
  7 for a secure electronic fax ("e-fax") without probative value, 8 for a secure electronic fax with probative value, 9 for a secure electronic letter file with probative value, 10 for a registered electronic letter file with secure acknowledgment of receipt with probative value, 11 for a secure electronic structured file with probative value, 12 for a registered electronic structured file with secure acknowledgment of receipt with probative value and 13 for a dematerialized secret document with probative legal value.

As regards the rating of the identity and digital documents, the technique for measuring and rating the security and the probative legal value applied to all the paper and dematerialized documents is set forth succinctly hereinbelow, in the form of tables, so as to show the originality of the method and the complexity of the systems implemented.

1. Validation Score for the document
  a. Registered personal identification
    i. Registered sender
      1. Identity card 0 to 4
      2. Fixed secret code+Rating 0 to 2
      3. Mobile secret code+Rating 0 to 3
      4. Certificate.PEM 0 to 4
    ii. Registered recipient
      1. Identity card 0 to 4
      2. Fixed secret code+Rating 0 to 2
      3. Mobile secret code+Rating 0 to 3
      4. Certificate.PEM 0 to 4
  b. Documentary support
    i. Non structured (address) 0 to 1
    ii. Structured text 0 to 10
    iii. Structured text and network 0 to 15
    iv. Compliance check 0 to 6
  c. Internal procedure (entitlements)
    i. Sender 0 to 4
    ii. Recipient 0 to 4
  d. External procedure
    i. Inter change convention 0 to 4
    ii. Trusted third party intermediation 0 to 4
  e. Personal signature (consent)
    i. Sender
    ii. Click 0 to 1
    iii. Sealed click 2 to 4
    iv. Recipient
    v. Click 0 to 1
    vi. Sealed click 2 to 4
  f. Procuration (registration)
    i. Sender 0 to 4
    ii. Recipient 0 to 4
  g. Transport confidentiality encipherment
    i. Sending
      1. https (transport) 0 to 2
      2. PKI (data) 0 to 4
    ii. Acknowledgement of receipt
      1. https (transport) 0 to 2
      2. PKI (data) 0 to 4
    iii. Downloading
      1. https (transport) 0 to 2
      2. PKI (data) 0 to 4
  h. Transport integrity sealing
    1. Sending
      1. SHA1 0 to 3
      2. SIG 0 to 4
    ii. Acknowledgement of receipt
      1. SHA1 0 to 3
      2. SIG 0 to 4
    iii. Downloading
      1. https (transport) 0 to 2
      2. PKI (data) 0 to 4
      i. Time-stamping
        i. Sending 0 to 4
        ii. Acknowledgement of receipt 0 to 4
      j. Traceability journals: summary list
        Trusted third party TTP with bailiff sequestration
        i. Sender identity 0 to 1
        ii. Recipient identity 0 to 1
        iii. Documentary support 0 to 1
        iv. Internal procedure (charging) 0 to 1
        v. External procedure (application+partner file) 0 to 1
        vi. Personal signature (consent)
          1. Sender 0 to 1
          2. Recipient 0 to 1
        vii. Procuration 0 to 1
        viii. Encipherment
          1. Sender 0 to 1
          2. Recipient 0 to 1
        ix. Sealing
          1. Sender 0 to 1
          2. Recipient 0 to 1
        x. Time-stamping
          1. Sender 0 to 1
          2. Recipient 0 to 1
2. Validation Score for correspondence
  k. Delivery to mailbox (endorsement)
    With a sender trusted third party 0 to 4
    Without sender trusted third party 0 to 1
    l. Delivery to secure correspondence account
      i. Without bilaterality 0 to 1
      ii. With bilaterality 0 to 4
  m. Notification by post 0 to 3
  n. Notification by secure eMail or SMS 0 to 3
  o. Acknowledgement of receipt by post
    i. Without pairing of the registered content 0 to 1
    ii. With pairing of the registered content 0 to 4
  p. Electronic acknowledgment of receipt
    i. Without certified signature 0 to 0
    ii. With certified signature:
      1. With pairing of the content 0 to 4
      2. Without pairing of the content 0 to 1
  q. Management of reception anomalies
    i. Notice of non-receipt 0 to 2
    ii. Notice of partial receipt
      1. Identity anomaly 0 to 4
      2. Integrity anomaly 0 to 4
      3. Confidentiality anomaly 0 to 4
      4. Structured file anomaly 0 to 4
      5. Settlement anomaly 0 to 4
  r. Traceability journals: summary list
    Trusted third party TTP with bailiff sequestration
    i. Delivery 0 to 1
    ii. Notification 0 to 1
    iii. Acknowledgement of receipt 0 to 1
    iv. Anomalies 0 to 1
3. Validation score for archiving
  s. Physical archiving 0 to 2
  t. Electronic archiving:
    i. Data Center Standard NZ (DMZ) 0 to 4
    ii. Electronic safe 0 to 4
      1. Deposition number 0 to 2
        a. Bilaterality 0 to 4
        b. Without bilaterality 0 to 2
      2. Signature of the archiver third party
        By default: encipherment and sealing 0 to 4

3. TTP restitution procedure 0 to 4
4. TTP transfer procedure 0 to 4
5. Pairing of documents in folder 0 to 4
6. Certified true copy endorsement 0 to 4
u. Traceability journals: summary list
Trusted third party TTP with bailiff sequestration
i. Physical or electronic archiving 0 to 1
ii. Deposition in the electronic safe 0 to 1
iii. Signature of the archiver Third party
By default: encipherment and sealing 0 to 1
iv. Restitution 0 to 1
v. Transfer of the original document 0 to 1
vi. Pairing 0 to 1
vii. Certified true copy endorsement 0 to 1

The invention claimed is:

1. A method for securing a data transfer, comprising:
a step of preparation of a transmission of a document from a sender to at least one recipient, comprising:
evaluating by a processor at least one transmission attribute chosen from a group of transmission attributes comprising at least an identification attribute of the at least one recipient known to the sender before transmission of the document; and
giving the sender access to the evaluation of the value of the at least one transmission attribute; and
if the evaluation of the value of the at least one transmission attribute matches or exceeds a level of confidence set by the sender, a step of actual transmission of said document and if the evaluation of the value of the at least one transmission attribute is lower than the level of confidence, a step of stopping or not performing the transmission.

2. The method of claim 1, wherein the evaluation is dependent on correspondence anomalies observed for each transmission attempt.

3. The method of claim 1, wherein the evaluation is dependent on elements provided by the recipient in a step of registering with a service for electronic transmission of documents.

4. The method of claim 1, further comprising a step of evaluating an identification of the sender of said document and, upon access to the document by the recipient, a step of providing the recipient with the evaluation of the identification of the sender.

5. A method for securing a data transfer, the method comprising:
a step of creating a document;
a step of identifying at least one recipient of said document;
a step of storing a copy of the document in a first memory accessible by a sender of the document but not accessible by a recipient of the document; and
for each recipient of the document,
a step of evaluating by a processor at least one transmission attribute chosen from a group of transmission attributes comprising at least an identification attribute of the at least one recipient before transmission of the document;
if the evaluation of the value of the at least one transmission attribute matches or exceeds a level of confidence set by the sender, a step of storing a copy of the document in a second memory accessible by said recipient of the document but not accessible by the sender of the document; and
if the evaluation of the value of the at least one transmission attribute matches or exceeds a level of confidence set by the sender, a step of transmitting to each recipient of the document an information item representative of existence of a copy of the document in said second memory, and if the evaluation of the value of the at least one transmission attribute is lower than the level of confidence, a step of stopping or not performing the transmission.

6. The method of claim 5, wherein in a step of authenticating the recipient to grant access to a copy of said document, an acknowledgment of receipt is constructed, and said method further comprises a step of storing, in each of the first and second memories, said acknowledgment of receipt in conjunction with a copy of said document.

7. The method of claim 5, wherein in a step of creating the document, attributes representative of conditions of authentication of the recipient are allocated to said document.

8. A method for securing a data transfer, the method comprising:
a step of creating a document;
a step of identifying at least one recipient of said document;
a step of storing the document and the identification of each recipient;
a step of evaluating by a processor at least one transmission attribute chosen from a group of transmission attributes comprising at least an identification attribute of the at least one recipient before transmission of the document;
only if the evaluation of the value of the at least one transmission attribute matches or exceeds a level of confidence, a step of electronic transmission, to at least one electronic address of each recipient of the document, of an information item representative of the existence of the document at the disposal thereof; and
for at least one recipient of the document,
a step of determining whether the elapsed duration since the step of electronic transmission and before the receipt of the document, by said recipient of the document, is greater than a predetermined duration; and
if, for said recipient of the document, the elapsed duration since the step of electronic transmission and before the receipt of the document, by said recipient of the document, is greater than a predetermined duration, a step of printing said document and of transmitting the printed document to a postal address of said recipient; and
if the evaluation of the value of the at least one transmission attribute is lower than the level of confidence, a step of stopping or not performing the transmission.

9. A method for securing a data transfer, the method comprising:
a first identification step of a user in which said user provides one or more electronic addresses;
a step of preparation of message transmission from said user or to said user, by utilizing said first identification step comprising evaluating by a processor at least one transmission attribute chosen from a group of transmission attributes comprising at least an identification attribute obtained from the first identification step of the user before transmission of a message;
a second identification step of a user, in which said user provides proof of identity and a pair of asymmetric keys is allocated to the user; and
a step of transmitting messages, from said user or to said user, by implementing said pair of asymmetric keys only if the evaluation of the value of the at least one transmission attribute matches or exceeds a level of confidence; and
if the evaluation of the value of the least one transmission attribute is lower than the level of confidence, a step of stopping or not performing the transmission.

10. A method for securing a data transfer, the method comprising:
   a step of assigning respective values of trusted attributes to a process for transferring data from a document sender to at least one document recipient comprising evaluating by a processor at least one transmission attribute chosen from a group of transmission attributes comprising at least an identification attribute of each document recipient performed before document transmission,
   a step of editing a document, by a document sender, in the course of which the document sender defines the at least one document recipient and a required value of trusted attributes required for transmission of said document, and
   for each document recipient for which the respective value of trusted attributes assigned to the process for transferring data from the document sender to the respective document recipient are greater than the required value, a step of transmitting said document to said respective document recipient; and if the respective value of the trusted attributes is lower than the required value, then stopping or not performing the transmission.

11. A device for securing data transfer, comprising:
   a means for performing an attempted transmission of a document from a sender to at least one recipient, by implementing at least one transmission attribute, and
   for at least one step of attempted transmission,
      an evaluation means suitable for evaluating a value of the at least one transmission attribute chosen from a group of transmission attributes comprising at least an identification attribute of the at least one recipient known to the sender before transmission of the document,
      a means for giving the sender access to the evaluation of the value of the at least one transmission attribute, and
      a means for transmitting the document to the recipient if the value of the at least one transmission attribute matches or exceeds a level of confidence set by the sender, and for stopping or not performing the transmission otherwise.

* * * * *